(12) United States Patent
Suzuki et al.

(10) Patent No.: US 7,668,760 B2
(45) Date of Patent: Feb. 23, 2010

(54) DISTRIBUTION MANAGEMENT DEVICE, DISTRIBUTION MANAGEMENT METHOD, PROGRAM STORAGE MEDIUM AND DISTRIBUTION MANAGEMENT SYSTEM

(75) Inventors: Kunimasa Suzuki, Kanagawa (JP); Yukari Takehira, Tokyo (JP); Yasuhiro Ueda, Tokyo (JP); Shigeaki Arai, Tokyo (JP); Michiko Sekikawa, Tokyo (JP); Lisa Naomi Schlais, Tokyo (JP); Takashi Yamazaki, Kanagawa (JP); Tsuyoshi Maeda, Saitama (JP); Noriko Ishii, Saitama (JP); Kentaro Tanigaki, Tokyo (JP); Hirokazu Takahashi, Tokyo (JP); Futaba Shinohara, Tokyo (JP)

(73) Assignee: Sony Corporation, Tokyo (JP)

( * ) Notice: Subject to any disclaimer, the term of this patent is extended or adjusted under 35 U.S.C. 154(b) by 354 days.

(21) Appl. No.: 09/800,524

(22) Filed: Mar. 8, 2001

(65) Prior Publication Data

US 2002/0010658 A1    Jan. 24, 2002

(30) Foreign Application Priority Data

Mar. 8, 2000    (JP)    ............................. 2000-068651

(51) Int. Cl.
*G06Q 10/00* (2006.01)
*G06Q 20/14* (2006.01)
*G06G 1/14* (2006.01)

(52) U.S. Cl. ......................................... 705/28; 705/22

(58) Field of Classification Search .................. 705/28, 705/29

See application file for complete search history.

(56) References Cited

U.S. PATENT DOCUMENTS

| 5,179,643 | A |   | 1/1993 | Homma et al. |
| 5,256,863 | A |   | 10/1993 | Ferguson et al. |
| 5,311,424 | A | * | 5/1994 | Mukherjee et al. ............ 705/29 |
| 5,893,076 | A | * | 4/1999 | Hafner et al. ................. 705/28 |
| 5,930,764 | A | * | 7/1999 | Melchione et al. ............ 705/10 |
| 6,003,019 | A | * | 12/1999 | Eaton et al. .................... 705/42 |
| 6,028,940 | A |   | 2/2000 | Tanaka et al. |
| 6,044,354 | A | * | 3/2000 | Asplen, Jr. ...................... 705/7 |
| 6,223,215 | B1 | * | 4/2001 | Hunt et al. .................. 709/217 |

(Continued)

Primary Examiner—F. Zeender
Assistant Examiner—Mussa Shaawat
(74) Attorney, Agent, or Firm—Oblon, Spivak, McClelland, Maier & Neustadt, L.L.P.

(57) ABSTRACT

A distribution management device, a distribution management method, a program storage medium and a distribution management system are disclosed. The client order data of the merchandise 4 of the sales channel utilized the internet 3 and the store order data of the merchandise 4 for the quantity sold of the sales channels excluding the Internet 3 are received by the sales managing server 20 via the internet 3. The stock of merchandise 4 is controlled by the settlement/delivery instructing server 21 based on the client and store order data. The actual sales condition of merchandise in each sales channel is grasped by the shipment control server 55 based on the storage data and the delivery condition data obtained from the client and store order data and the storage data and delivery condition data obtained from the settlement/delivery instructing server 21, and the supply of merchandise 4 to the manufacturing factory will be instructed based on the actual sales condition. Thus, the distribution stocks to each of sales channels can be one-dimensionally controlled and can be efficiently distributed in the market based on the actual sales information. And thereby, the stocks can be constantly and certainly secured to various sales channels.

21 Claims, 13 Drawing Sheets

U.S. PATENT DOCUMENTS

| | | | |
|---|---|---|---|
| 6,263,317 B1 * | 7/2001 | Sharp et al. | 705/26 |
| 6,341,271 B1 * | 1/2002 | Salvo et al. | 705/28 |
| 6,381,582 B1 * | 4/2002 | Walker et al. | 705/26 |
| 6,493,678 B1 * | 12/2002 | Foster et al. | 705/28 |
| 6,618,706 B1 * | 9/2003 | Rive et al. | 705/30 |
| 2003/0130905 A1 * | 7/2003 | Foster et al. | 705/26 |
| 2003/0212610 A1 * | 11/2003 | Duffy et al. | 705/26 |

* cited by examiner

SALES REGISTRATION

SERIAL No. INPUT IS NECESSARY FOR ALL COMPUTER SALES. WARRANTY WILL BE APPLIED BASED ON REGISTRASION

COMPUTER:

1. ITEM NAME: PCG-N505X  MANUFACTURE NUMBER 999999999
2. ITEM NAME: PCG-C1XN   MANUFACTURE NUMBER
3. ITEM NAME: PCG-C1XN   MANUFACTURE NUMBER
4. ITEM NAME: PCG-C1XN   MANUFACTURE NUMBER
5. ITEM NAME: PCG-C1XN   MANUFACTURE NUMBER

ACCESSORY

1. ACCESSORY NAME: PCGA-BP52  × QUANTITY SOLD
2. ACCESSORY NAME: PCGA-BP52  × QUANTITY SOLD
3. ACCESSORY NAME: PCGA-BP52  × QUANTITY SOLD
4. ACCESSORY NAME: PCGA-BP52  × QUANTITY SOLD
5. ACCESSORY NAME: PCGA-BP52  × QUANTITY SOLD

[CLIENT INFORMATION]  [RESET]  [MENU]

FIG. 5

CLIENT INFORMATION REGISTRATION

SALES INFORMATION — 45A

COMPUTER:

| ITEM CODE (46A) | ITEM NAME (46B) | UNIT PRICE (46C) | QUANTITY SOLD (46D) | SUB-TOTAL (46E) | |
|---|---|---|---|---|---|
| 28303062 | PCG-N505X | 14800.00 | 1 | 14800.00 | DELETE (47) |
| | | | | | DELETE (48) |

MANUFACTURE NUMBER — 46F
999999999

ACCESSORY: — 46G

TOTAL AMOUNT SOLD: 14800.00

[CLIENT INFORMATION] (53)  [RESET] (52)  [HEAD] (51)

CLIENT INFORMATION REGISTRATION

CLIENT INFORMATION

- USER ID:
- PURCHASE PATTERN: ● FOR HOUSEHOULD USE ○ FOR BUSINESS USE
- SEX: MALE ▽
- SURNAME:
- GIVEN NAME:
- BIRTHDAY: 1 ▽ JAN ▽ 1966
- PLACE OF WORK:
- ADDRESS:
- COUNTRY: HONG KONG
- HOME TELEPHONE NUMBER:
- OTHER TELEPHONE NUMBER:
- FAX NUMBER:
- E-MAIL ADDRESS:
- PLACE OF CONTACT: ● HOME TELEPHONE NUMBER ○ OTHER TELEPHONE NUMBER ○ Fax ○ E-mail

[CLIENT INFORMATION] [RESET] [HEAD]

| ORDER NUMBER | SALES METHOD | ID/CODE | NAME OF CLIENT | TOTAL AMOUNT SOLD | DATE ORDERED | TIME ORDERED | CONDITION | DETAIL | CHANNEL |
|---|---|---|---|---|---|---|---|---|---|
| 58927 | CALL CENTER | ○△△.□□ | □△○ ○× | 3,280.00 | 2000-02-03 | 17:34:08 | PRELIMINARY CHECK OK | DETAIL | N.A. |
| 59603 | WEB |  | △○○ ×○ | 2,099.00 | 2000-02-06 | 23:20:58 | PRELIMINARY CHECK OK | DETAIL | N.A. |
| 60277 | CALL CENTER | ○×△.×□ | □○○ ○□ | 3,780.00 | 2000-02-08 | 17:36:48 | PRELIMINARY CHECK OK | DETAIL | N.A. |
| 60951 | WEB |  | ×△○ ×□ | 3,990.00 | 2000-02-10 | 18:10:07 | PRELIMINARY CHECK OK | DETAIL | N.A. |
| S28117 | RETAIL STORE | hd002 | ○△○ ×△ | 14,800.00 | 2000-02-03 | 12:17:16 | PRELIMINARY CHECK OK | DETAIL | CANCEL |
| S28118 | RETAIL STORE | hd002 | ○×□ □△ | 14,800.00 | 2000-02-03 | 12:20:03 | PRELIMINARY CHECK OK | DETAIL | CANCEL |
| S28119 | RETAIL STORE | hd002 | △○△ ×□ | 14,800.00 | 2000-02-03 | 12:22:31 | PRELIMINARY CHECK OK | DETAIL | CANCEL |
| S28120 | RETAIL STORE | hd002 | ○□△ ○△ | 14,800.00 | 2000-02-03 | 12:25:06 | PRELIMINARY CHECK OK | DETAIL | CANCEL |
| S28121 | RETAIL STORE | hd012 | ×□○ ×□ | 14,800.00 | 2000-02-03 | 12:28:10 | PRELIMINARY CHECK OK | DETAIL | CANCEL |
| S28122 | RETAIL STORE | hd012 | △○○ ○□ | 14,800.00 | 2000-02-03 | 12:29:11 | PRELIMINARY CHECK OK | DETAIL | CANCEL |
| S28223 | DIRECT-SALES STORE | hs003 | □○○ ×□ | 14,800.00 | 2000-02-03 | 12:31:18 | PRELIMINARY CHECK OK | DETAIL | CANCEL |

FIG. 12

| ITEM NAME | ITEM CODE | CENTER STOCK | DELIVERY COMPANY STOCK | TIME REGISTERED |
|---|---|---|---|---|
| CMD-C8 (White) | 59040392 | 2 | 2 | 11:50:13 |
| CMT-ED2 | 14363677 | 2 | 2 | 11:50:13 |
| CMT-EX1 | 14363777 | 2 | 2 | 11:50:13 |
| CMT-MD1DX | PK000887 | 2 | 2 | 11:50:14 |
| CMT-MD1DX | PK000938 | 2 | 0 | 11:50:14 |
| CMT-SD1 | PK000789 | 2 | 2 | 11:50:14 |
| CMT-SD1 | PK000894 | 2 | 2 | 11:50:13 |
| CMT-VP1 | 14368277 | 2 | 2 | 11:50:13 |
| D-EJ01 | 49217270 | 1 | 1 | 11:50:13 |
| D-EJ915 | 49217670 | 2 | 2 | 11:50:13 |
| DCR-PC100E | 02004613 | 2 | 2 | 11:50:13 |
| DCR-PC3E | 02003213 | 4 | 4 | 11:50:13 |
| DCR-TRV10E | 02003613 | 4 | 4 | 11:50:13 |
| DCR-TRV110E | 48820713 | 2 | 2 | 11:50:13 |
| DCR-TRV310E | 48822913 | 2 | 2 | 11:50:13 |
| DCR-TRV410E | 48822413 | 2 | 2 | 11:50:13 |
| DCR-TRV8E | 02003913 | 3 | 2 | 11:50:13 |
| DCR-TRV900E | 02003013 | 2 | 2 | 11:50:13 |
| DHC-MD373 | 14367277 | 2 | 2 | 11:50:13 |

FIG. 13

DISTRIBUTION MANAGEMENT DEVICE, DISTRIBUTION MANAGEMENT METHOD, PROGRAM STORAGE MEDIUM AND DISTRIBUTION MANAGEMENT SYSTEM

BACKGROUND OF THE INVENTION

1. Field of the Invention

The present invention relates to a distribution management device, a distribution management method, a program storage medium and a distribution management system. More particularly, the present inventions are suitably applied to a distribution management system utilizing a telecommunication network for controlling the distribution and stocks of merchandise.

2. Description of the Related Art

Distribution management systems are physical distribution systems which utilize the communication network.

In such physical distribution systems, multiple communication terminals for households are connected via the Internet to an information database that is the source of supply of, for example, musical data.

Moreover, each information database is connected to a center server for controlling these databases via the specific communication line, and the center server is connected with the maker server for controlling the merchandise, the physical distribution managing server for controlling the delivery of merchandise and the billing control server for controlling the processing of electronic settlement of accounts via the distribution only receive/dispatch order managing server to control the physical distribution and money via the specific communication line.

Then, in such physical distribution system, if the client accesses the shopping site via the network by means of the communication terminal and selects the desired merchandise from the merchandise catalog available at the shopping site and orders this, this ordered data is transmitted to the receive/dispatch order managing server through the information database and the center server.

Thus, the receive/dispatch order managing server, after confirming that the merchandise ordered is available for delivery by the maker server based on the order data, delivers the merchandise to the client's home (owner of the communication terminal) or the nearby convenience store, and electronically settles accounts for payment of that merchandise by the billing control server. And thus, the electronic settlement of accounts using the network can be realized.

But with the diversification of sales channels in recent years, new sales channels outside the network are utilized in addition to the sales channel network of the physical distribution system. Thus, the stocks are controlled based on the order data to be obtained via the network in the sales channel which utilizes the network, and in the sales channel of sales companies outside the network. The market demand is thus predicted per a fixed period of time such as per month and the stock is controlled based on that prediction.

In the sales channel utilizing the network, the merchandise ordered is directly delivered to the client from the stock holding maker. Thus, the actual sales conditions of merchandise including the transition of merchandise ordered and the quantity of merchandise sold can be grasped and the stock can be controlled almost correctly.

However, in the sales channel utilized by sales companies outside the network, the sales company controls the stock based on the independently predicted result of the market demand per the fixed period of time independently. Therefore, it is difficult for the maker to grasp the actual sales condition of the merchandise in the sales companies correctly and thus, there are cases where the merchandise are left unsold, or contrary to this, the merchandise is sold out and the maker cannot cope with the client's demand.

Accordingly, in such physical distribution systems, the stock can be secured most correctly in the sales channel which utilizes the network. However, in the sales channel excluding the network it has been difficult to secure the stock correctly.

SUMMARY OF THE INVENTION

In view of the foregoing, an object of this invention is to provide a distribution management device, a distribution management method, a program storage medium and a distribution management system capable of securing the stocks correctly for various kinds of sales channels.

The foregoing object and other objects of the invention have been achieved by the provision of a distribution management device, a distribution management method, a program storage medium and a distribution management system in which the order information receiving means, as well as receiving the first order information of merchandise to be via the first sales channel which utilizes the network, receives the second order information of merchandise for the portion sold in each time the merchandise is sold via the second sales channel exclusive of the network, and the stock control means controls the stock of merchandise to be delivered to the first and the second sales channels based on the first and the second order information, and the supply control means grasps the actual sales condition of merchandise in the first and the second sales channels based on the first and the second order information and the stock control information of merchandise supplied from the stock control means, and instructs the supply of merchandise to the supplier of the stock based on the actual sales condition.

Accordingly, the stock circulation in the first and the second sales channels can be controlled one-dimensionally and the circulating stock can be effectively distributed in the market according to the actual sales condition of merchandise in the first and the second sales channels.

Moreover, since the supply of merchandise to be collected from the market due to the sales debut of new product during the fixed period before the new product is put on the market, the quantity of merchandise stocks to be collected from the market due to the new merchandise on sale can be remarkably reduced and tremendously reduce the unsatisfactory stocks left unsold when the new merchandise is put on the market can be reduced tremendously.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIG. 5 is a schematic diagram showing the construction of a sales registration screen;

FIG. 6 is a schematic diagram showing the construction of a client information registration screen;

FIG. 7 is a schematic diagram showing the construction of a client information registration screen;

FIG. 12 is a schematic diagram showing the construction of an order condition screen; and FIG. 13 is a schematic diagram showing the construction of a stock control screen.

DETAILED DESCRIPTION OF THE EMBODIMENT

Preferred embodiments of this invention will be described with reference to the accompanying drawings:

(1) Theorem of Electronic Commerce Utilized Internet

Figure 1:
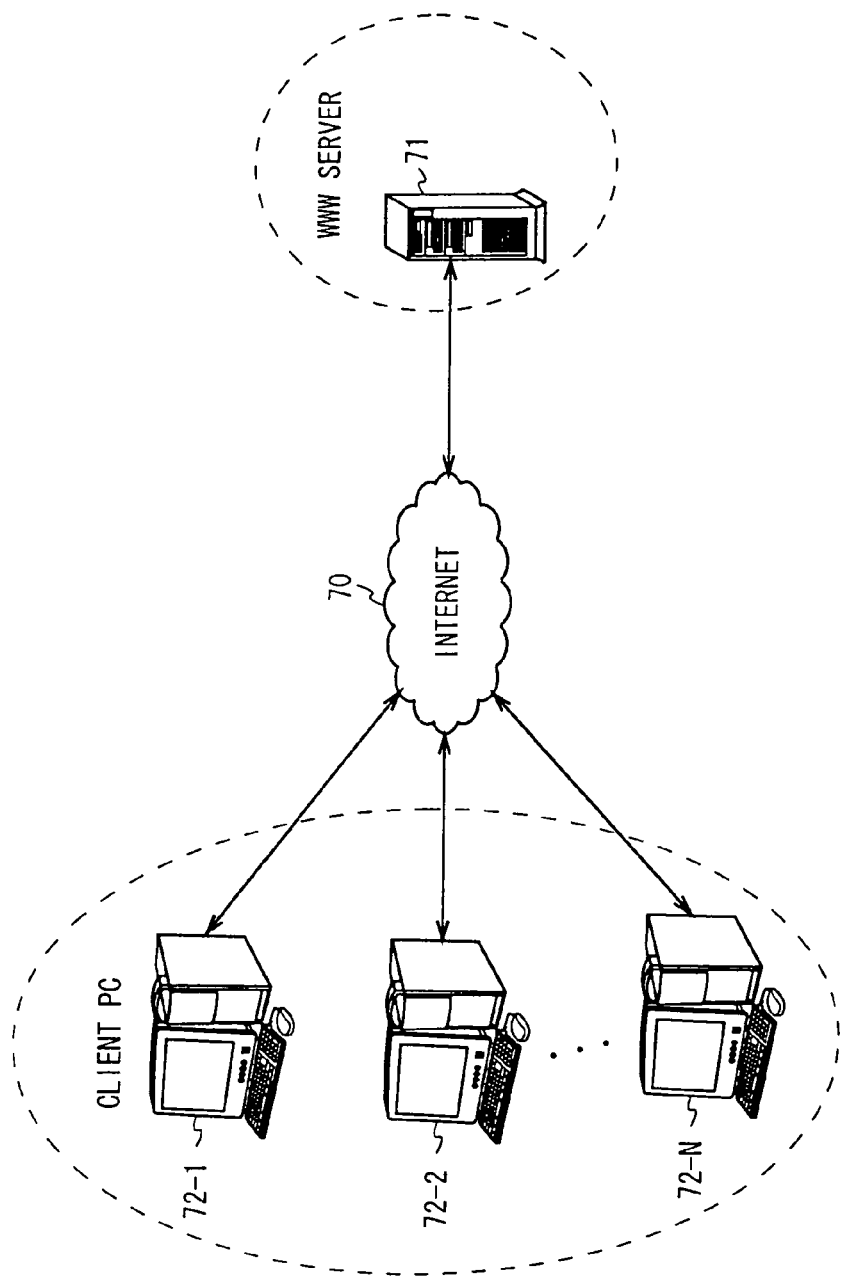
FIG. 1 is a conceptual schematic diagram showing the theorem of electronic commerce utilized Internet according to the present invention.

As shown in FIG. 1, Internet 70 comprises multiple computers and computer network, and by connecting these computers via the communication link, information can be transmitted and received between these computers using various services such as the electronic mail, Gopher and World Wide Web (WWW).

The server 71 to provide the WWW service on the Internet 70 (this is called as Web server, or Web site, and hereinafter referred to as WWW server) holds Web pages of graphic information (graphics and images) on a hard disc.

Then, each resource of WWW, such as the WWW server 71 and Web page can be uniquely identified by the uniform resource locator (URL) that is the addressing technique for identifying the resource on the Internet 70.

Accordingly, in the client personal computers 72-1 to 72-N connected to the internet 70, when the URL of the Web page to which the client desires to access, or the URL of the WWW server 71 to support the Web page is defined by the predetermined transfer protocol such as Hyper Text Transfer Protocol (HTTP), the access request of the Web page will be transferred to the specified WWW server 71.

With this arrangement, in the client personal computer 72-1 to 72-N, when it receives the Web page transmitted from the WWW server 71 as a result of access request to the WWW server 71, it displays this on the display unit thus making the user having the client personal computers 72-1 to 71-N can read the Web page.

In practice, in the client personal computers 72-1 to 72-N, WWW browser as the application program to conduct the display of Web page received is stored in the hard disc in advance.

Furthermore, the Web page that is defined using the hyper text markup language (HTML) is typical as the Web page. And in the HTML document that defines the Web page, the mark called as 'tag' to specify how to express the Web page defined by HTML is included.

In this connection, the HTML document includes various tags to control displays of graphic, control and other functions. Moreover, the HTML document can specify the link destination inclusive of URL of Web page that can be used in the WWW server 71 requesting the access to the Web page or the other Web server 71.

Accordingly, in the client personal computers 72-1 to 72-N, when accessing to the Web page is requested, the transfer request of the HTML document that defines the Web page is sent to the WWW server 71.

Furthermore, in the client personal computers 72-1 to 72-N, when the HTML document transmitted from the WWW server 71 as a result of transfer request is received, Web page will be displayed according to the definition of that HTML document. And thus, the Web page can be read by the user of the client personal computer 72-1 to 72-N in the way of display as the provider intends.

Incidentally, in recent years such WWW has been used in the electronic commerce utilizing the internet 70.

In this case, the WWW server 71 prepares the Web page formed of merchandise catalog in which the merchandise on sale are electronically listed, and transmits that Web page to the client personal computers 72-1 to 72-N owned by the client responding to the client's access request.

Thus, in the client's client personal computers 72-1 to 72-N, Web page is displayed according to the client's direction and thus, the merchandise on sale can be seen by the client.

Then, in the client's client personal computers 72-1 to 72-N, when the merchandise that the client desires to buy is specified on the Web page, this will be informed to the WWW server 71. And as a result, responding to the request of client information to be given from the WWW server 71, the name of client who wants to buy the merchandise, the client's credit card number, and the address showing the destination of delivering the merchandise will be transmitted as the client information.

Thus, when the WWW server 71 receives the client information, confirms the order content by transmitting the Web page for the merchandise order confirmation to the client's client personal computer 72-1 to 72-N, and then adjusts the delivery schedule of the merchandise.

In the electronic commerce utilizing the Internet 70, electronic commerce for various merchandise, such as the electronic merchandise (i.e., music) to be distributed electrically to the client utilizing the internet 70, and the physical merchandise (i.e., personal computer) to be delivered to the client using the delivery company, can be realized.

In this connection, there is the language called extensible markup language (XML) to define the Web page. Although the XML uses the tag as is the case of HTML, this can express the construction of sentence and its meaning and also can specify the attribute such as hierarchical construction and data type to the tag by the document type definition (DTD).

Accordingly, in the WWW server 71, if the Web page is defined using the XML, data for information processing such as the order code, item code, unit price and quantity, memorized in the database in advance respectively can be embedded into various tags such as order code, item code, unit price, or quantity. Thus, the Web page can be used not only for seeing the Web page but also can be used for executing the information processing such as order calculation by outputting the data for information processing embedded in these tags.

Figure 2:
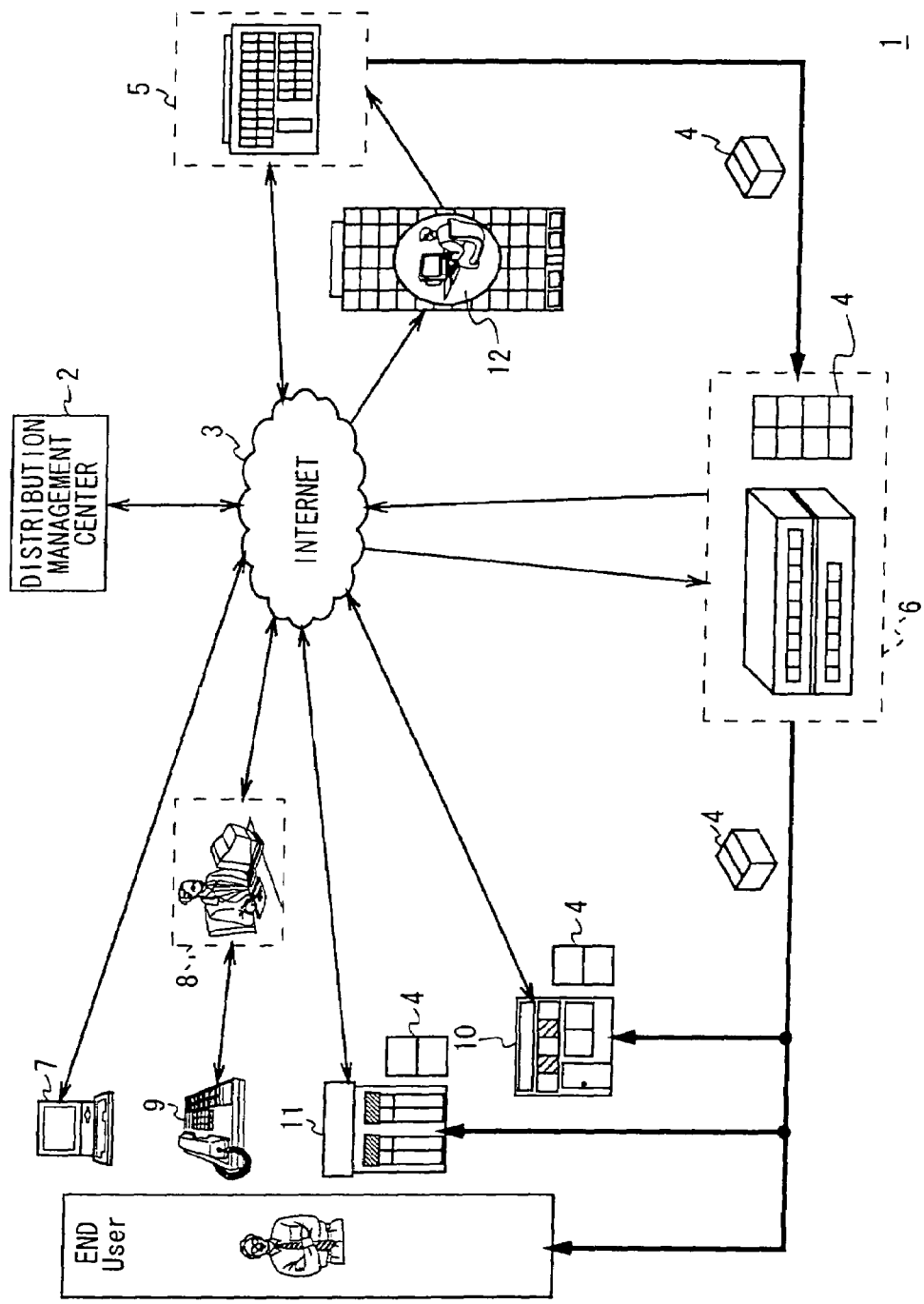
FIG. 2 is a conceptual schematic diagram showing one embodiment of general construction of the distribution management system according to the present invention.

(2) Distribution Management System According to the Embodiment of the Present Invention In FIG. 2, 1 generally shows a distribution management system according to the present invention, and the distribution management center 2 is connected to a manufacture factory to manufacture merchandise 4 for sale and a delivery company 6 to store and deliver the merchandise 4 via the internet 3, and the merchandise 4 can be sold through both the sales channel using the Internet 3 and the sales channel excluding the Internet 3.

In this connection, unless otherwise specified the reception/transmission of various data will be conducted in the same manner after FIG. 2 as in the case of the Internet 70, WWW server 71 and the client personal computer 72-1 to 72-N described above in FIG. 1.

when the distribution management center 2 is accessed by the personal computer 7 owned by the client via the internet 3, it makes the client see the merchandise catalog of the shopping site via the personal computer 7.

Then, when an order data of the desired merchandise 4 (hereinafter referred to as client order data) is transmitted from the client who saw the merchandise catalog by means of personal computer, the distribution management center 2 transmits a delivery instruction data for instructing the delivery of the merchandise 4 to the delivery company 6 via the internet 3 based on the client order data.

The delivery company 6 holds various merchandise 4 in the warehouse as the stock and takes out the merchandise 4 ordered by the client from the warehouse based on the delivery instruction data given from the distribution management center 2 and delivers this to the client.

Furthermore, the distribution management center 2 is connected with the call center 8 via the Internet 3. And if the call center 8 receives a purchase request of the desired merchandise 4 by means of telephone 9 or facsimile (not shown in Fig.) from the client who saw the merchandise catalog, the call center 8 forms a client order data of the desired merchandise 4 based on the purchase request, and transmits this to the distribution management center via the Internet 3.

Thus, when the client order data is given from the call center 8, the distribution management center 2 transmits a delivery instruction data of the merchandise 4 ordered to the delivery company 6 via the Internet 3 based on the client order data.

Then, the delivery company 6 ships out the merchandise 4 ordered by the client from the warehouse based on the delivery instruction data supplied from the distribution management center 2 in the same manner as in the case described above and delivers this to the client.

Then, when the merchandise 4 is ordered using the internet 3, the distribution management center 2 also obtains the client data such as the client's name, address, place of contact, mail address, the type of credit card owned by the client and the credit card number, and forms a settlement data based on the client data and the price charged for the merchandise 4 to be purchased by the client.

With this arrangement, the distribution management center 2 transmits the settlement data to the bank having business contact, and makes the bank settle the payment of the client regarding the merchandise 4 to be purchased by the client.

Thus, in the distribution management system 1, the electronic commerce of the merchandise 4 utilizing the internet 3 would be established and the merchandise 4 can be sold to the client via the sales channel utilizing the internet 3.

In addition to this, one or more retail stores 10 constitute a sales channel exclusive of internet 3 and one or of a plurality of direct-sales stores 11 are provided in the distribution management system 1. And in the retail store 10 and the direct-sales store 11, the merchandise 4 can be sold to the client who visits the store.

The retail store 10 and the direct-sales store 11 store the merchandise 4 in stock respectively. And the upper limit of the quantity of merchandise 4 stored in stock (hereinafter referred to as the standard quantity of stocks) will be set according to the number of merchandise 4 to be sold in a week in the retail store 10 and the direct-sales store 11.

Then, the retail store 10 and the direct-sales store 11 transmit the order data showing the merchandise 4 sold and the quantity of these merchandise sold (hereinafter referred to as store order data) to the distribution management center 2 via the Internet 3 whenever they sell the merchandise 4 to the client.

The distribution management center 2 controls the merchandise 4 sold and the quantity of merchandise sold in the retail store 10 and the direct-sales store 11 based on the store order data supplied from the retail store 10 and the direct-sales store 11, and periodically forming the delivery instruction data showing the merchandise 4 and the quantity of merchandise sold during the fixed period of time (e.g., several times in a week), and transmitting this to the delivery company 6.

The delivery company 6 ships out the merchandise 4 for the quantity specified from the warehouse based on the delivery instruction data given from the distribution management center 2, and by delivering this to the retail store 10 and the direct-sales store 11, replenish the merchandise 4 as stocks.

Thus, the distribution management center 2 is capable of preventing the merchandise 4 stored in the retail store 10 and the direct-sales store 11 from having excessive stocks exceeding the standard quantity of stocks.

Moreover, the distribution management center 2 sets a rate (such as twice a week) on which it transmits the delivery instruction data concerning the retail store 10 and the direct-sales store 11 to the delivery company 6 based on the period from the time it requests the delivery of merchandise to the delivery company 6 to the time when the merchandise is actually delivered to the retail store 10 and the direct-sales store 11 (time and the number of days) and the day on which the merchandise 4 are sold most (such as week-end) in the retail store 10 and the direct-sales store 11.

Thus, the distribution management center 2 can certainly prevent the retail store 10 and the direct-sales store 11 from 4 having a shortage of stock by controlling stocks of the retail store 10 and the direct-sales store 11.

When the delivery instruction data is given from the distribution management center 2, the delivery company 6 transmits the delivery condition data showing whether the merchandise 4 has been shipped from the warehouse or whether the merchandise 4 shipped from the warehouse has been delivered to the client, the retail store 10 and the direct-sales store 11 or not (e.g., several times a day) to the distribution management center 2 via the Internet 3 periodically.

Furthermore, the delivery company 6 controls the quantity of merchandise 4 stored in the warehouse according to the type of merchandise and transmits the storage data showing the quantity of merchandise 4 according to its type to the distribution management center 2 via the Internet 3 periodically (e.g., several times a day).

With this arrangement, the distribution management center 2 can grasp all actual sales conditions of the sales channel utilized the Internet 3 and the sales channel excluding Internet 3 based on the storage data and delivery condition data to be given from the delivery company 6 and the client order data and the store order data to be given via the Internet 3.

Then, the distribution management center 2 periodically (e.g., once a week) forms the shipment instruction data according to the actual sales conditions on all sales channels during that period and transmits this to the manufacturing factory 5 via the Internet 3.

Thus, the manufacturing factory 5 ships the specified quantity of merchandise 4 from among various merchandise 4 already manufactured by the factory based on the shipment instruction data given from the distribution management center 2 and replenish the merchandise 4 to the delivery company 6 as the stock.

Thus, the distribution management center 2 can prevent the delivery company 6 from having excessive stocks or becoming short of stock, and can control the delivery company 6 store the merchandise 4 sufficient for all sales channels as stocks.

Furthermore, since the distribution management center 2 supplies the shipment instruction data based on the actual sales conditions of all sales channels to the manufacturing factory 5, it can make the manufacturing factory 5 easily plan the manufacturing plan and reexamine this according to the actual sales condition and can make the manufacturing factory 5 manufacture the merchandise 4 and procure materials.

In this connection, in the distribution management system 1, the manufacture control center 12 is set up in the maker main office is connected to the Internet 3. The manufacture control center 12 obtains the storage data, delivery condition data, client order data and store order data from the distribution management center 2 via the Internet 3 and forms the shipment instruction data according to the actual sales condition based on the storage data, delivery condition data, client order data and the store order data and also can transmit this to the manufacturing factory 5 via the Internet 3.

In addition to this, the distribution management center 2 controls the merchandise 4 to be sold according to the specific item codes, and when the maker determines the date of sales debut of new product, the date of sales debut of new product and the item code and the product code of the merchandise to be collected from the market due to the sales of new product (hereinafter referred to as old product) will be given prior to that sales debut date.

When these item codes are supplied to the distribution management center 2, the distribution management center 2 comparing the item code showing the storage data given from the delivery company 6 and the item code of the old product, forms the shipment instruction data of new product excluding old products even if old products stored in the delivery company 6 are in short supply, and transmits this to the manufacturing factory 5.

With this arrangement, the distribution management center 2 stops the supply of old products stored in the delivery company as the stock corresponding to the date of sales debut of new product and as well as gradually decreasing the quantity of old products, decreases the quantity of old products stored in the retail store 10 and the direct-sales store 11 as stocks.

Then, the distribution management center 2 transmits the order instruction data including the item code of new product and the quantity of shipment to the manufacturing factory 5 timing to the date of sales debut of new product. Thus, the new product will be shipped to the delivery company 6 from the manufacturing factory 5 and new product can be sold to the client from the sales debut date.

Figure 3:
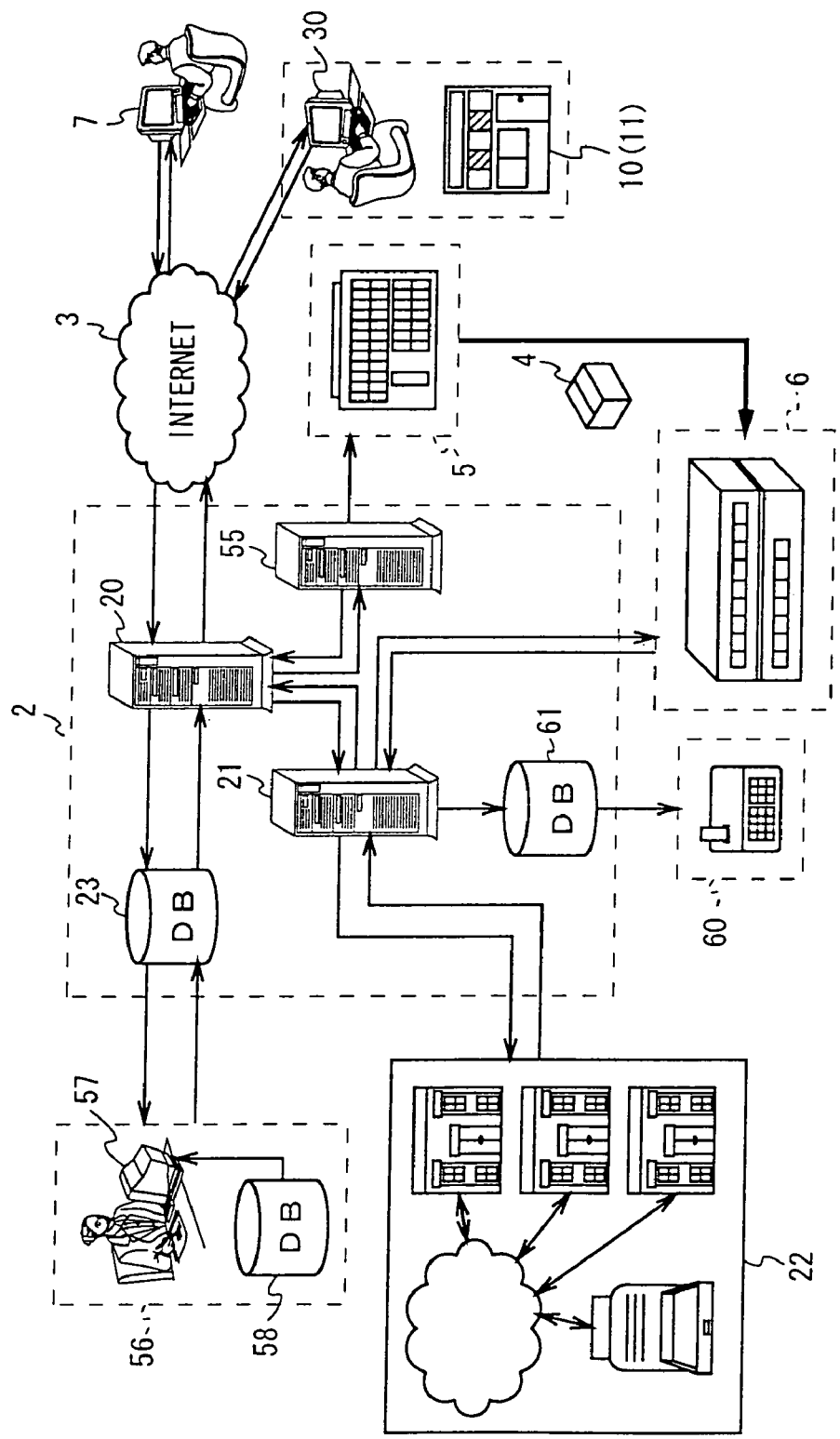
FIG. 3 is a conceptual schematic diagram showing the construction of distribution management center.

Here, FIG. 3 shows the detailed construction of distribution managing center 2 omitting a part of internet 3.

When the distribution management center 2 is accessed from the client's personal computer 7 via the Internet 3, the sales managing server 20 comprised of WWW server, responding to this access, transmits the page data of Web page of the shopping site stored in advance in the hard disc to the personal computer 7 via the Internet 3.

The personal computer 7 shows a series of Web pages of the merchandise catalog based on the page data to the client. And when the merchandise specification data of the desired merchandise and the client data are entered into the Web page for merchandise order contained in the merchandise catalog, the personal computer 7 transmits the page data of Web page in which the merchandise specification data and the client data are entered to the sales managing server 20 via the Internet 3 as the client order data.

When the client order data is supplied from the personal computer 7, the sales managing server 20 sends out this client order data to the settlement/delivery instructing server 21.

Then, when the client order data is supplied from the sales managing server 20, the settlement/delivery instructing server 21 transmits the type of the client's credit card and the credit card number contained in the client order data to his bank 22 via the exclusive communication line as the credit data.

When the credit data is supplied from the settlement/delivery instructing server 21, the bank 22 examines the client's credit card based on that credit data and informs the resultant to the settlement/delivery instructing server 21.

Thus, when the examination result of the credit card is given from the bank 22, the settlement/delivery instructing server 21 informs this to the sales managing server 20. And at the same time, if that client's credit card is usable, by transmitting the client order data and the settlement data based on the price charged to the delivered merchandise 4 to the bank 22, the bank electronically conducts the settlement processing on the client's payment for the merchandise 4 to be purchased by the client.

Furthermore, if the client's credit card is usable, the settlement/delivery instructing server 21 forms delivery instruction data from the client's name, address, item code of the merchandise 4 ordered and the quantity ordered of the merchandise based on the client order data, and transmits this to the delivery company 6 via the Internet 3.

In this connection, if the credit card is in usable condition as a result of examination of the credit card, the sales managing server 20 registers this client after memorizing the client order data in the database 23. And simultaneously it informs to the personal computer 7 that the order has been accepted.

Furthermore, if the credit card is unusable as a result of examination of the client's credit card, the sales managing server 20 informs the personal computer 7 via the Internet 3 and suggests by showing the other credit card and sending the order again.

Figure 4:
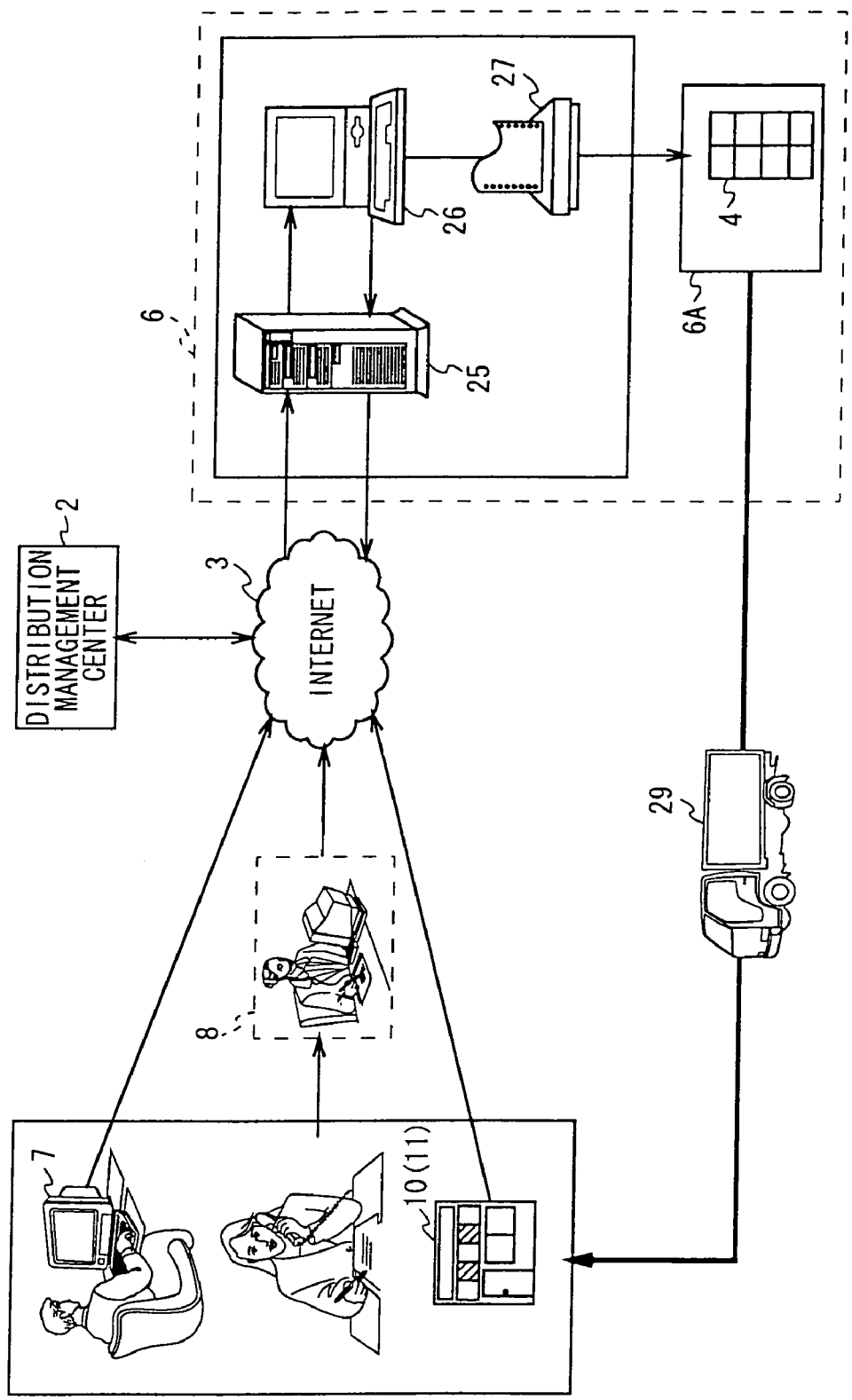
FIG. 4 is a conceptual schematic diagram showing the construction of delivery company.

As shown in FIG. 4, the delivery company 6 captures the delivery instruction data given from the settlement/delivery instructing server 21 into the delivery instruction device 26 via the delivery managing server 25.

The delivery instruction device 26, by outputting the delivery instruction data to the printer 27, prints a delivery instruction 28 by the printer 27 based on the delivery instruction data. Thus, the delivery company 6 ships out the specified quantity of merchandise 4 specified from the warehouse 6A according to that delivery instruction and delivers this to the client by the delivery car 29.

Furthermore, the delivery instruction device 26 is supplied with delivery condition data showing the delivery condition of the merchandise 4 corresponding to the delivery instruction data, and outputs this delivery condition data to the delivery managing server 25.

Thus, the delivery managing server 25 transmits the most up-to-date delivery condition data to the settlement/delivery instructing server 21 (FIG. 3) of the distribution management center 2 corresponding to the delivery instruction data via the Internet 3 and can make the settlement/delivery instructing server 21 grasp the delivery condition of the merchandise 4.

In this connection, when the input/output storage information (such as the name of merchandise, the quantity of merchandise shipped out and the item code) is entered whenever the merchandise 4 is shipped from the warehouse 6A for delivery, or when the merchandise 4 shipped out from the manufacturing factory 5 (FIG. 2) is put into the warehouse 6A, the delivery instruction device 26 forms the storage data showing the quantity of stocks in the warehouse 6A and transmits this to the delivery managing server 25.

The delivery managing server 25, successively updating the storage data to be supplied from the delivery instruction device 26, periodically transmits the up-to-date storage data to the settlement/delivery instructing server 21 of the distribution management center 2 via the Internet 3, thus the settlement/delivery instructing server 21 can grasp the quantity of stocks in the delivery company 6.

In this connection, it is acceptable if the delivery system of this delivery company 6 would be realized in the form to create a business alliance with the separate company from the main business of the distribution management center 2.

When the distribution management center 2 (FIG. 3) is accessed from the call center 8 (FIG. 2) that received the purchase request of merchandise 4 from the client by means of telephone 9 (FIG. 2) or facsimile, the sales managing server 20 transmits the page data of the merchandise order Web page to the call center 8 via the Internet 3 responding to that access.

Thus, the call center 8 displays the Web page for the merchandise order based on the page data on the personal computer (not shown in Fig.). And under this condition, the call center 8 enters the merchandise specification data of the merchandise 4 ordered from the client on the Web page and the client data, and transmits the page data in which the merchandise specification data and the client data are entered to the sales managing server 20 via the Internet 3 as the client order data.

Thus, the sales managing server 20 sells the merchandise 4 to the client in the same manner as in the case where the merchandise 4 is ordered by the personal computer 7 as well as the settlement/delivery instructing server 21, the delivery company 6 and the bank 22.

On the other hand, the retail store 10 and the direct-sales store 11 (FIG. 3) are equipped with personal computer 30. And each time they sell the merchandise 4 to the client, they acquire the page data of the Web page for merchandise order formed for store use from the sales managing server 20 of the distribution management center 2 by operating the personal computer 30.

Then, in the personal computer 30, the predetermined menu screen (not shown in Fig.) is displayed on the display unit (not shown in Fig.) based on the Web page. And when the display of sales registration screen is requested on the menu screen, a sales registration screen 35 formed of the Web page shown in FIG. 5 is displayed on the display unit in place of the menu screen.

On this sales registration screen 35, input areas 36A and 36B for entering the sales condition of the items 4 such as personal computer and accessory, are provided according to its type. And when the scroll bar 37 placed on the right side of the sales registration screen 35 is operated by the mouse (not shown in Fig.), the Central Processing Unit (CPU) (not shown in Fig.) of the personal computer scrolling displays input areas 36A and 36B that can not be displayed at a time.

The input area 36A of the personal computer consists of the item name display column 36AX showing the item name of the personal computer and the manufacture number display column 36AY showing the manufacture number of the merchandise 4, and the accessory input area 36B consists of the accessory name display column 36BX showing the name of accessory and the sales quantity display column 36BY showing the quantity of sales of that accessories.

Then, when the mouse cursor (not shown in Fig.) is moved and clicked on the item name display column 36AX, the manufacture number display column 36AY, the accessory name display column 36BX showing the name of accessory and the sales quantity display column 36BY according to the operation of the mouse, the CPU puts these display columns in the condition input available. And under such condition, when the name of item, item number, the name of accessory and the quantity sold are entered via the keyboard (not shown in Fig.), the CPU displays these.

In this connection, in each of input areas 36A and 36B, a selection button 38 is placed adjacent to the item name display column 36AX and the accessory name display column 36BX respectively. And when the mouse cursor is moved and clicked on the selection button 38 according to the mouse operation, the CPU displays the item name or the accessory name of the personal computer on the adjacent item name display column 36AX and accessory name display column 36BX successively switching responding to that click. And thus, the item name and accessory name of the personal computer can be easily entered.

Furthermore, a menu button 39, a reset button 40 and a client information button 41 are provided on the upper side of the sales registration screen 35. And when the mouse cursor is moved and clicked on the menu button 39 according to the mouse operation, the CPU displays the menu screen in place of the sales registration screen 35.

When the mouse cursor is moved and clicked on the reset button 40 according to the operation of mouse, the CPU blanks out all item names, manufacture numbers, accessory name and the quantity sold of the personal computer displayed on each of input areas 36A and 36B and puts it into unused condition. Thus, when various information are entered by mistake, these can be entered again.

Then, when the mouse cursor is moved and clicked on the client information button 41 according to the mouse operation, the CPU displays the client information registration screen 43 formed of Web page shown in FIG. 6 and FIG. 7 on the display unit in place of the sales registration screen 35. The client information registration screen 43 shown in FIGS. 6 and 7 consists of a series of one screen. And since this screen cannot be displayed on the display unit of the personal computer at a time, the CPU scrolling displays the part that cannot be displayed at a time when the scroll bar 44 placed on the right side of the client information registration screen 43 is operated by the mouse.

In the client information registration screen 43, a sales information input area 45A (FIG. 6) and a client information input area 45B (FIG. 7) are provided. In the sales information input area 45A, code display column 46A to show item codes according to the type of merchandise 4, and the item name display column 46B, the unit price display column 46C to show the unit price of the merchandise 4, the quantity sold display column 46D, the sub-total display column 46E to show the sub-total according to each type of the merchandise 4, and the manufacture number display column 46F are provided. And at the same time, on the lower part of the sales information input area 45A, the total price display column 46C to show the total amount is provided.

In this connection, in FIG. 6, various types of display columns relating to the personal computer are displayed in the sales information input area 45A of the client information registration screen 43, and the display columns relating to accessories and other merchandise 4 are omitted for simplifying explanations.

Then, in the sales information input area 45A, when the mouse cursor is moved and clicked on the code display column 46A, the item name display column 46B, unit price display column 46C, the quantity sold display column 46D, sub-total price display column 46E, and the manufacture number display column 46F according to the mouse operation, the CPU makes these display columns to the input available condition. And when the item code, item name, unit price, quantity sold, sub-total, manufacture number are entered under this condition, the CPU displays these.

In this connection, in the personal computer 30, merchandise information such as item codes, item names and unit prices of various kinds of merchandise 4 are stored in the inside hard disc in advance. And if either one of information on the item code, item name and unit price is entered on the client information registration screen 43, the CPU retrieves the merchandise information in the hard disc based on the information entered and displays the remaining information automatically.

Furthermore, when the unit price and the quantity sold of the merchandise 4 are displayed, the CPU calculates the sub-total price according to the unit price and quantity sold, and displays the sub-total prices of all merchandise 4 sold. And calculating the total amount from the sub-total, that is the total amount charged, the CPU displays this.

With this arrangement, the CPU can decrease input errors sharply on the sales information input area 45A.

Furthermore, in the sales information input area 45A, delete buttons 47 and 48 are provided on the right side of the sub-total price display column 46E and on the left side of the manufacture number display column 46F respectively.

Then, when the mouse cursor is moved and clicked on the delete button 47 on the right side of the sub-total price display column 46E according to the mouse operation, the CPU blanks out the item code, item name, unit price, the quantity sold and the sub-total price displayed on the code display column 46A, the item name display column 46B, unit price display column 46C, the quantity sold display column 46D and the sub-total display column 46E, and when the mouse cursor is moved and clicked on the delete button 48 on the right side of the manufacture number display column 46F by operating the mouse, the CPU deleting the manufacture number displayed on the manufacture number display column 46F, makes this unused condition. And thus, when various kinds of information are entered erroneously, information can be entered again.

On the other hand, in the client information input area 45B (FIG. 7) of the client information registration screen 43, user identification (ID) display column 50A, purchase form display column 50B, sex display column 50C, name display column 50D, birthday display column 50E, occupation display column 50F, address display column 50G, country name display column 50H, home telephone number display column 50I, other telephone number display column 50J, the Fax number display column 50K, E-mail address display column 50L, and the place of contact display column 50M are provided.

Then, in the user ID display column 50A, the user ID of the client specific is displayed and in the purchasing form display column 50B, the merchandise 4 is purchased either for household use or business use. And in the sex display column 50C, the sex of the client is displayed, and the name of client is displayed on the name display column 50D.

Furthermore, the client's birthday is displayed in the birthday display column 50E, the name of firm for which the client works is displayed in the firm name display column 50F, the client's address is displayed in the address display column 50G, and the name of country in which the merchandise 4 is sold is displayed on the country name display column 50H.

Furthermore, the client's home phone number is being displayed on the home phone number display column 50I. And in the other phone number display column 50J, such as the phone number of the firm where the client works or h can be contacted and the phone number of the client's portable telephone other than his home phone number will be displayed. Moreover, on the Fax number display column 50K, the client's facsimile number is displayed and the client's E-mail address is displayed in the E-mail address display column 50L. And the place of contact specified by the client will be selected and displayed in the place of contact display column 50M.

At this point, if the client data of the client who purchased the merchandise 4 is not registered in the client database 23 of the distribution management center 2 (FIG. 3), and when the mouse cursor is moved and clicked on the sex display column 50C, the name display column 50D, the birthday display column 50E, the firm display column 50F, the address display 50G, home telephone number display column 50I, the other phone number display column 50J, Fax number display column 50K, E-mail address display column 50L according to the mouse operation, the CPU makes these display columns to the input available conditions. And under such conditions, when the sex, name, birthday, firm name, address, home phone number, and the other phone number, Fax number, and E-mail address are entered, the CPU displays these.

Furthermore, white circle selection buttons 50BA and 50BB, 50MA to 50MD are provided on the purchase pattern display column 50B and the place of contact display column 50M respectively. And when the mouse cursor is moved and clicked on the selection button 50BA and 50BB, 50MA to 50MD, the CPU turns these to black circles and displays. Thus, the selected purchase pattern and the place of contact can be identified.

Furthermore, selection buttons 50CA, 50EA and 50EB are provided on the sex display column 50C and the birthday display column 50E respectively. And when the mouse cursor is moved on the selection buttons 50CA, 50EA and 50EB and clicked, the CPU, successively switching the sex and the date corresponding to that click, displays these. Thus, it can facilitate the input of the sex and birthday.

In this connection, a head button 51, a reset button 52 and a client information button 53 are provided on the lower part of the client information input area 45B. When the mouse cursor moves on the head button 51 and this is clicked by operating the mouse, the CPU shifts the client information registration screen 43 on which the head button 51 is displayed visible to the position that its upper side fits to the upper side of the display unit (i.e., the upper side of the sales information input area 45A) and displays.

Furthermore, when the mouse cursor moves on the reset button 52 and this is clicked according to the mouse operation, the CPU deletes all information entered on the client information registration screen 43 and puts it into unused condition.

Furthermore, when the mouse cursor moves on the client information button 53A and this is clicked according to the mouse operation, the CPU displays the client information input area 45B fitting its upper side to the upper side of the display unit.

Accordingly, when various information are entered on the sales registration screen 35 and the client information registration screen 43, the CPU makes the page data of the sales registration screen 35 as the sales notification data based on the prescribed transmission command and the page data of the client information registration screen 43 as the item specification data showing the merchandise 4 purchased by the client and the client data. And after adding specific store codes of the retail store 10 and the direct-sales store 11 to these sales notification data, sales specification data and the client data, the CPU transmits these to the sales managing server 20 (FIG. 3) of the distribution management center 2 via the Internet 3 as store order data.

On the other hand, in the case where the client data of the client who purchased the merchandise 4 has been registered already on the client database 23 of the distribution managing center 2 (FIG. 3) and when the mouse cursor is moved on the user ID display column 50A according to the mouse operation and this is clicked, the CPU puts the user ID display column 50A into the input available condition. And under this condition, the user ID that has been notified to the client already from the distribution management center 2 by such as the E-mail is entered via the keyboard, the CPU displays the user ID on the user ID display column 50A.

Then, the CPU thus displaying the user ID, informs the user ID to the sales managing server 20 (FIG. 3) of the distribution management center 2 via the Internet 3. And by retrieving the client database 23 via the sales managing server 20, the CPU obtains the client data corresponding to the user ID.

Thus, the CPU, as well as displaying the sex, name, birthday, firm name, address, home telephone number, other telephone number, facsimile number and E-mail address on the sex display column 50C, the name display column 50D, the birthday display column 50E, the office display column 50F, the address display column 50G, home telephone number display column 50I, the other telephone number display column 50J, Fax number display column 50K and the E-mail address display column 50L by the mouse operation, displays the purchase pattern and the place of contact in the purchase pattern display column 50B and the place of contact display column 50M.

With this arrangement, if the client who purchased the merchandise 4 has been already registered to the distribution management center 2, when only user ID of the client is entered onto the client information registration screen, the CPU can display various other kinds of information automatically. Thus, the client information can be presented from being input by mistake and the input of the client's information can be remarkably simplified.

Then, the CPU, displaying various information on the sales registration screen 35 and the client information registration screen 43, transmits the store order data to the sales managing server 20 of the distribution management center 2 via the Internet 3 in the same manner as described above based on the transmission command.

As shown in FIG. 3, when the store order data is supplied from the personal computer 30 of the retail store 10 and the direct-sales store 11, the sales managing server 20 memorizes the client data contained in the store order data and the merchandise specifying data in the client database 23. And thus, the sales managing server 20 registers the client who purchased merchandise 4 from the retail store 10 and the direct-sales store 11.

In this connection, if the client who purchased the merchandise 4 has not been registered at this point, the sales managing server 20 assigns a user ID to that client according to the client's registration and informs the client via the electronic mail.

Furthermore, if the client who purchased the merchandise 4 has been registered at this point, the sales managing server 20 updates all client data of the client writing over the client data recorded in the past since there is a possibility of change of address and telephone number contained in the client data caused by the client's address change, or the sales managing server 20 updates only information changed in that client order data.

The client order data of the client who purchased the merchandise 4 via the Internet 3 is comprised of almost the same format as the merchandise specifying data and the client data (i.e., image data of the client information registration screen 43) to be obtained from the retail store 10 and the direct-sales store 11 and the contents and configuration of the registration (such as issuance of the user ID) are approximately the same as above.

When the registration of client is completed, the sales managing server 20 informs the acceptance of merchandise 4 order to the retail store 10 and the direct-sales store 11 via the Internet 3. And the sales managing server 20 simultaneously transmits the sales notification data (i.e., image data of the sales registration screen 35) and the store code to the settlement/delivery instructing server 21 as the store order instruction data.

The settlement/delivery instructing server 21, storing the store order instruction data supplied from the sales managing server 20, controls the merchandise 4 sold and the quantity of merchandise sold in each store, and forming the delivery instruction data periodically per each store based on the accumulated store order instruction data, transmits this to the delivery company 6 via the Internet 3.

Thus, the delivery company 6 delivers the specified merchandise 4 to the retail store 10 and the direct-sales store 11, per the store code, in the same manner that the merchandise 4 is delivered to the client described above based on the delivery instruction data given from the settlement/delivery instructing server 21.

Incidentally, in the distribution management center 2, the sales managing server 20 and the settlement/delivery instructing server 21 are connected to the shipment control server 55.

This shipment control server 55 is supplied with the client order data and the store order data from the sales managing server 20 and also supplied with the storage data and the delivery condition data from the settlement/delivery instructing server 21. Also this shipment managing server 55 grasps the actual sales condition of all sales channels by adding up the client order data, the store order data, the storage data and the delivery condition data, and forms the shipment instruction data based on the actual sales condition.

In practice, the shipment control server 55 of the distribution management center 2 is equipped with a hard disc in which CPU and various programs are stored. The CPU specifies the shipment of merchandise 4 to the manufacturing factory 5 based on the shipment instruction program stored in the hard disc in advance.

Figure 8:
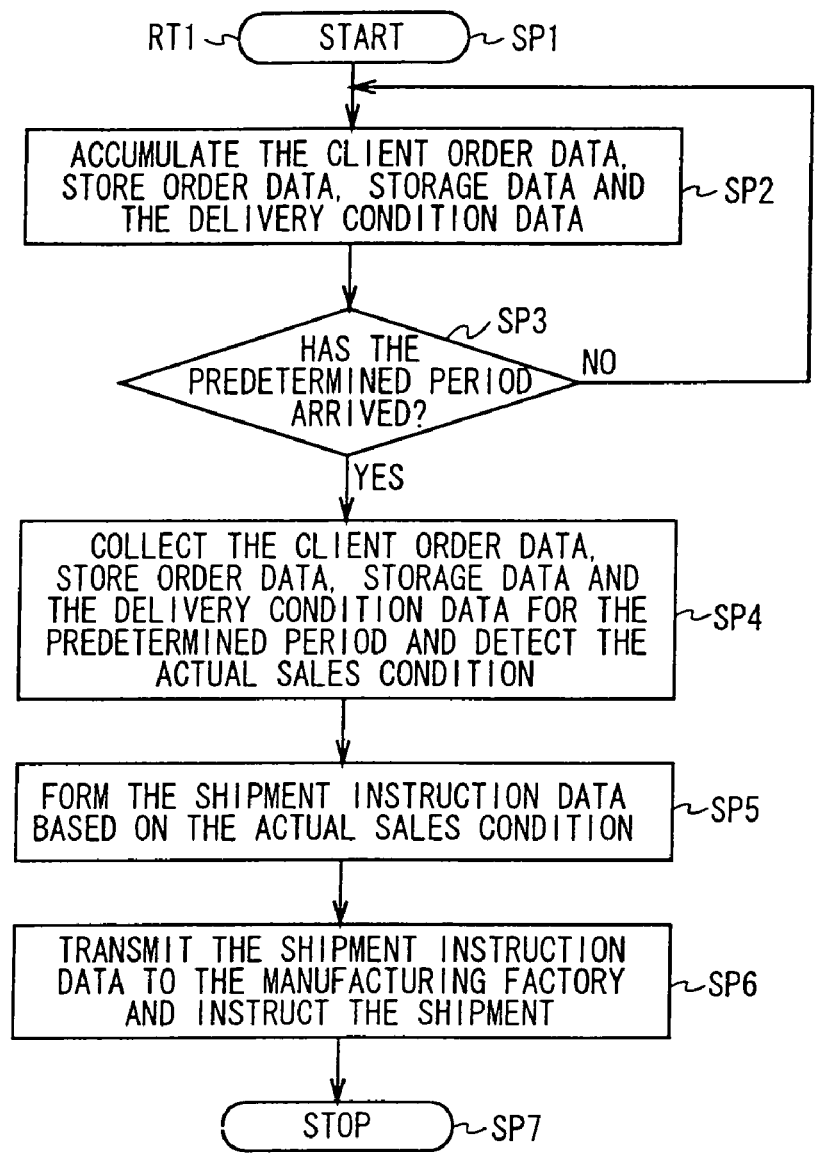
FIG. 8 is a flow-chart showing the shipment instruction processing procedure.

More specifically, the CPU enters to the shipment instruction processing procedure RT1 shown in FIG. 8 from the step SP1 based on the shipment instruction program. At the following step SP2, the CPU, reading out the client order data and the store order data from the sales managing server 20, stores these in the hard disc. And simultaneously, the CPU reading out the storage data and the delivery condition data from the settlement/delivery instructing server 21, stores these in the hard disc and proceeds to the step SP3.

At the step SP3, the CPU judges whether the predetermined period such as one week set in advance has arrived or not, and it continues the processing of the step SP3 till the predetermined period arrives.

Then, at this step SP3, when the predetermined period arrives, the CPU proceeds to the following step SP4. And the CPU collects the client order data, the store order data, storage data and the delivery condition data stored during the predetermined period by using the fixed computational algorithm, and it detects the quantity of merchandise 4 sold according to its type in all sales channels during the predetermined period, order statistics of all merchandise 4 ordered per day during the predetermined period and the transition of all merchandise 4 ordered from before the predetermined period. And the CPU making the detection result as the actual sales condition in all sales channels, proceeds to the step SP5.

At the step SP5, the CPU calculates the quantity of shipment per type of the merchandise 4 by adding the condition as to whether the sales of merchandise 4 would be increased or decreased in future to the quantity of merchandise 4 actually sold based on the actual sales condition in all sales channels. And then, the CPU forming the shipment instruction data showing the quantity of shipment calculated, proceeds to the following step SP6.

At the step SP6, the CPU, by transmitting the shipment instruction data to the manufacturing factory 5 via the Internet 3, ships out the merchandise 4 instructed by the shipment instruction data to be shipped by the quantity specified to the delivery company 6. And proceeding to the step SP6, the CPU terminates the shipment instruction processing procedure RT1.

Accordingly, the shipment control server 55 ships the merchandise 4 to be sold to the delivery company 6 from the manufacturing factory 5 based on the actual sales condition in all sales channels during the predetermined period. And thus, the sufficient quantity of stocks corresponding to the actual sales of merchandise 4 can be effectively distributed in the market.

Then, in the distribution management center 2, the sales managing server 20 and the settlement/delivery instructing server 21 control the stocks stored in the retail store 10 and the direct-sales store 11 in the form of constant stock supply, and transmits the merchandise 4 directly from the delivery company 6 to the retail store 10 and the direct-sales store 11. In the sales channel using the Internet 3, by delivering the merchandise 4 directly to the client from the manufacturing company 6, they can control the stock in the market efficiently as if the manufacturing factory 5 is selling the merchandise 4 directly to the client in all sales channels.

Figure 9:
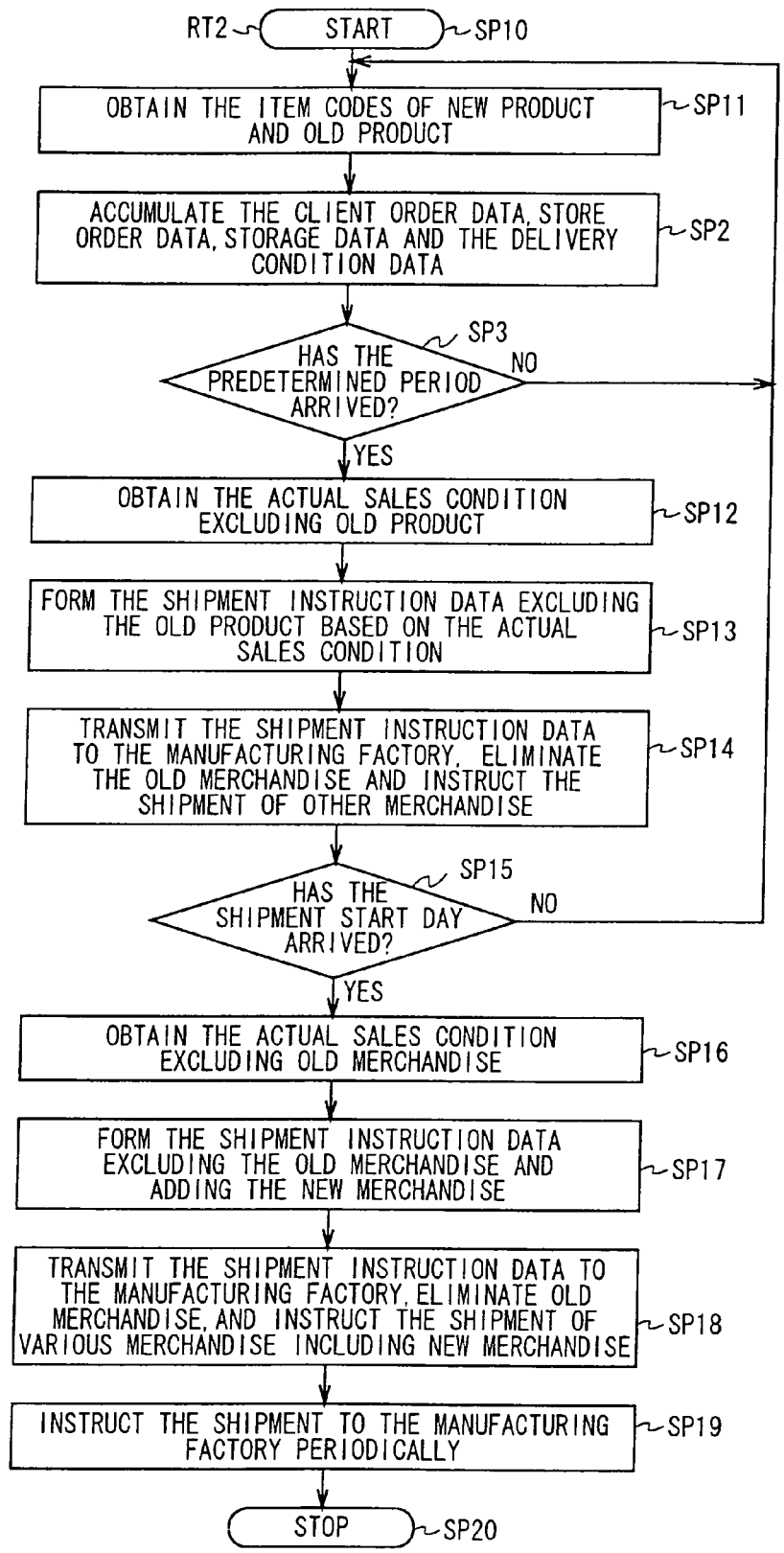
FIG. 9 is a flow-chart showing the shipment instruction processing procedure at the time when replacing the old product with the new product.

Moreover, when the sales debut day is informed prior to the sales of new product from the manufacture control center 12 (FIG. 2), during the predetermined period till the shipment of merchandise 4 starts, the CPU of the shipment control server 55 enters to the shipment instruction processing procedure RT2 of FIG. 9 in which the corresponding parts of FIG. 9 are designated the same reference numerals of FIG. 8, from the step SP10 based on the shipment instruction program. Then, at the following step SP11, the CPU obtains the item code of new product and the item code of old product transmitted from the manufacture control center 12, and proceeds to the step SP12 successively through the step SP2 and step SP3.

At the step SP12, the CPU deletes all information related to old products from the client order data, store order data, storage data and delivery condition data accumulated during the fixed period based on the item codes of old products. And by adding up the remaining client order data, store order data, storage data and the delivery data by using the prescribed computational algorithm, the CPU obtains the actual sales condition excluding old products in all sales channels, and proceeds to the following step SP13.

At this step SP13, calculating the quantity of shipment in each type of merchandise 4 by adding the condition as to whether the sales of merchandise 4 would be increased or decreased from now on, the CPU forms the shipment instruction data showing the quantity of shipment of other merchandise 4 excluding the old product, and proceeds to the following step SP14.

At the step SP14, the CPU, by transmitting the shipment instruction data to the manufacturing factory 5 via the Internet 3, makes the manufacturing factory 5 ship the specified merchandise 4 by the quantity specified to the delivery company 6 according the shipment instruction data excluding old products from among various merchandise 4 manufactured in the manufacturing factory 5, and proceeds to the following step SP15.

At this step SP15, the CPU judges whether the number of days till the sales start day of new product has reached to the preset number of shipment start days or not. And during the period till it reaches to the number of shipment start days, it returns to the step SP11 and repeats the processing loop from the step SP11 to the step SP14.

Here, the number of shipment start days is selected according to the number of days required for transporting the merchandise 4 from the manufacturing factory 5 to the delivery company 6 and for delivering the merchandise from the delivery company 6 to the retail store 10 and the direct-sales store 11 so that new product will be stored in the delivery company 6, the retail store 10 and the direct-sales store 11 when its sales starts.

Then, at the step. SP15, if the number of days till new product sales starts reaches to the number of shipment start days and an affirmative result is obtained, the CPU proceeds to the following step SP16. And as well as deleting all information relating to the old product from the client order data, store order data, storage data and the delivery condition data stored during the predetermined period based on the item code of old product and by adding up the remaining client order data, store order data, storage data and the delivery condition data using the prescribed computational algorithm, the CPU obtains the actual sales condition excluding old products in all sales channels and proceeds to the following step SP17.

At this step SP17, the CPU calculates the quantity of shipment in each type of merchandise 4 by adding the condition as to whether sales of these merchandise 4 would be increased or decreased in future to the quantity sold of various merchandise 4 excluding old merchandise. And simultaneously, the CPU forms the shipment instruction data adding the predicted quantity of sales to the new product, and proceeds to the following step SP18.

At the step SP18, by transmitting the shipment instruction data to the manufacturing factory 5 via the Internet 3, the CPU makes the delivery company 6 ship out various kinds of merchandise 4, as instructed by the shipment instruction data, and excluding old product from among various kinds of merchandise 4 and the quantity of new product specified to the delivery company 6, and then proceeds to the step SP19.

Then, at the step SP19, the CPU, repeats the same processing as described above in step SP16 through step SP19 until the sales start day of new product, and ships the merchandise 4 from the manufacturing factory 5 to the delivery company 6. And then, upon proceeding to the step SP20, the CPU terminates this shipment instruction processing procedure RT2.

Thus, since the shipment control server 55 supplies various merchandise 4 for the quantity of sales expected to the delivery company 6 based on the actual sales condition in all sales channels, by stopping the supply of old products to the delivery company 6 during the predetermined period till the sales start day of the new product, the shipment control server 55 can control the stock to the minimum decreasing the quantity of old products from the delivery company 6, and the new product can be distributed in the market as stock timing to the sales start day of new product.

Figure 10:
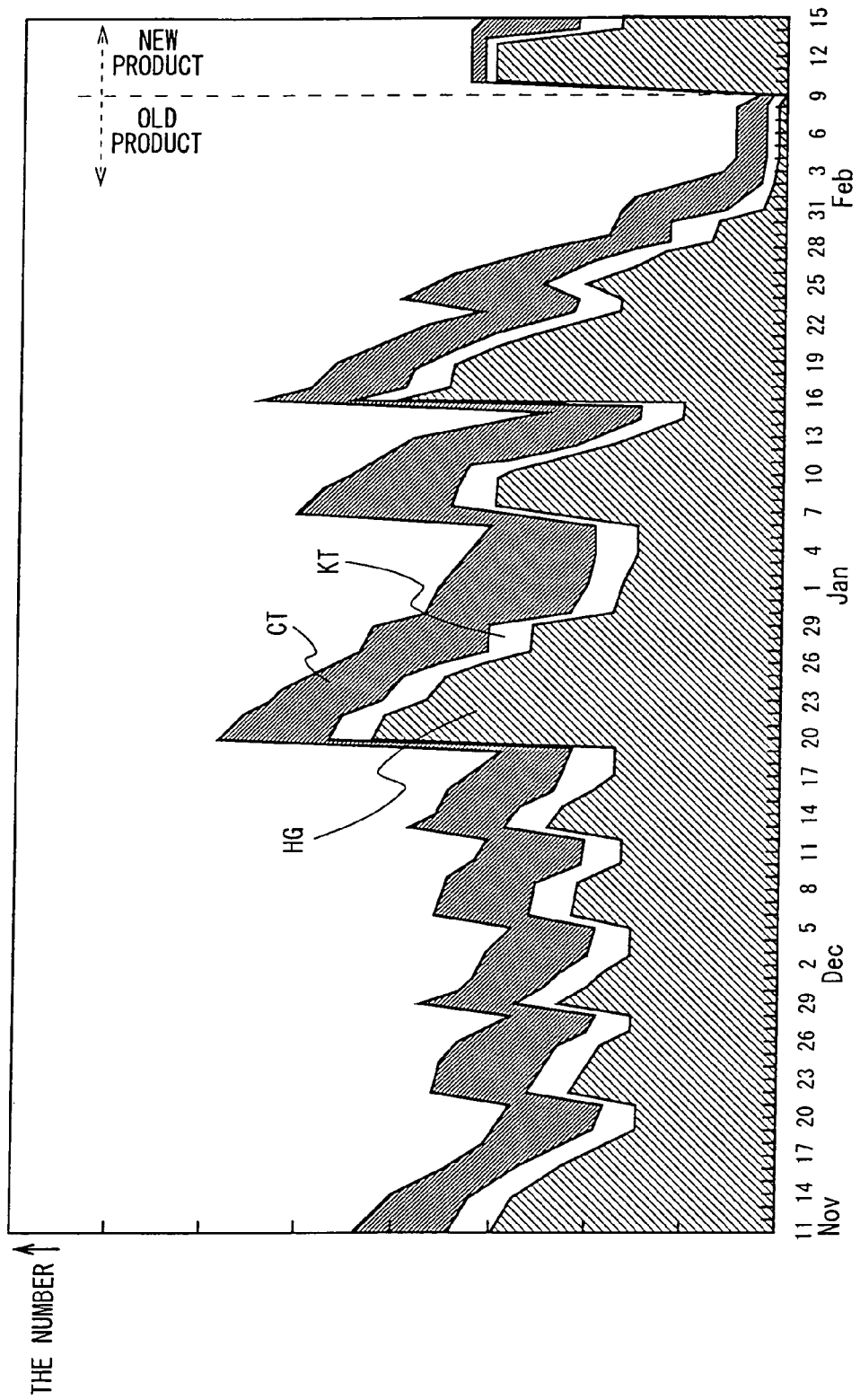
FIG. 10 is a brief linear diagram showing the transition of stocks in the market.

In practice, in FIG. 10, the first area HG shows the transition of the quantity of merchandise 4 stored in the delivery company 6 as stock. Also the second area KT shows the transition of the quantity of merchandise 4 stored in the retail store 10 as stocks, and the third area CT shows the transition of the quantity of merchandise stored as stock in the direct-sales store 11.

As described above in FIG. 9, since the distribution management center 2 controls the stock of the delivery company 6 based on the actual sales condition in all sales channels, old products stored as market stocks would be almost sold out by the time when sales of new product start by just stopping the supply of old product to the delivery company 6 before the new product sales starts. And the new product can be put in the market in a state in which old products are almost sold out in all retail stores 10 and direct-sales stores 11.

Thus, in the distribution management system 1, as is clear from FIG. 10, it is apparent that the stock put in the market can be controlled accurately even using the plural number of sales channels.

In this connection, the client database 23 of the distribution management center 2 is connected to the support center 56 via the specific communication line. The support center 56 is equipped with a personal computer 57 and a support database 58, and various data such as how to cope with the erroneous operation or when disorders occur concerning all merchandise 4 on sale are stored as database.

Accordingly, when an inquiry concerning the merchandise 4 is arrived from the client who bought the merchandise 4, the support center 56 detects the merchandise specification data and the client data in the client database 23 based on the client's name and the user ID by means of personal computer 57. And after confirming the merchandise 4 bought by the client by displaying the merchandise specification data and the client data of the client who sent the inquiry on the display of the personal computer 57, the support center 56 can cope with the client's inquiry accurately using the data in the support database 58 as occasion demands.

Furthermore, in the distribution management center 2, when the delivery condition data is supplied from the delivery company 6, the settlement/delivery instructing server 21 sends out the settlement data for sales company required for settling the account to the sales company 60, such as the total amount of sales of merchandise 4 to be delivered to the settlement database 61 and stores these.

Thus, the sales company 60 periodically reads out the delivery condition data and the settlement data for sales company from the settlement database 61 via the Internet 3 or the specific communication line, and establishes the sales of merchandise 4 according to the delivery condition of the merchandise 4 obtained based on the delivery condition data. Thus, the account settlement will be conducted such as once a month based on the settlement data for the sales company.

Figure 11:
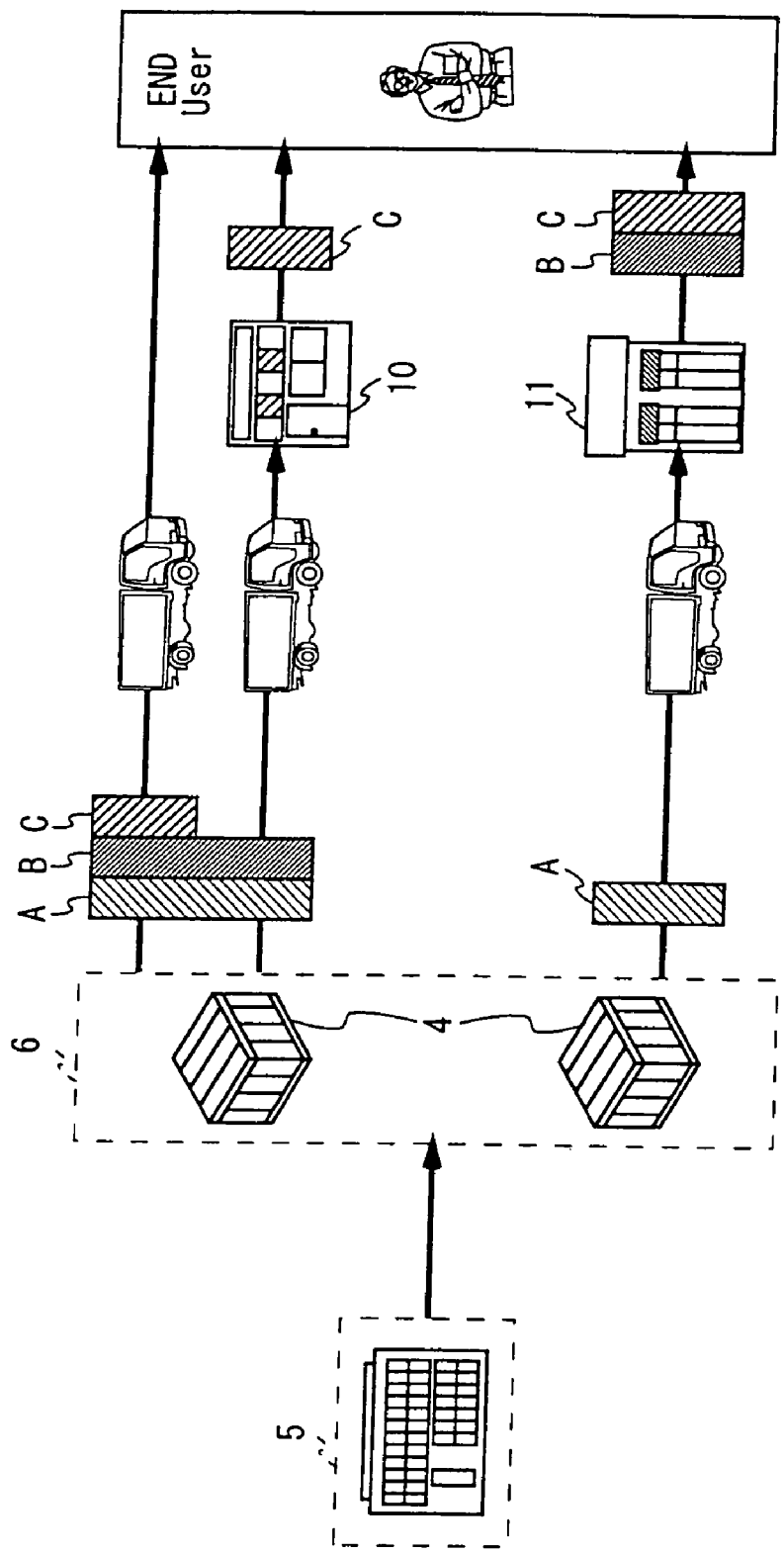
FIG. 11 is a conceptual schematic diagram illustrating the timing condition in which sales are established in each of sales channels.

At this point, as shown in FIG. 11, in this distribution management system 1, in order to distribute the merchandise 4 efficiently in the market the distribution management center 2 controls the merchandise 4 stored in the delivery company 6 as its assets. And the merchandise 4 will be distributed to all sales channels from the delivery company 6 under the control of the distribution management center 2.

Accordingly, although the sales company 60 does not store the merchandise 4 to be sold, it sells the merchandise 4 to the customer publicly in the name of maker, and establishes the sales according to the delivery condition of merchandise 4.

More specifically, in the distribution management system 1, when the merchandise 4 is delivered to the customer from the delivery company 6 utilizing the Internet 3 (FIG. 2), the maker obtains the cost of sales A by selling the merchandise 4 to the sales company 60. And at that time, the sales company 60 receives the cost of sales B from the payment of the price C from the customer.

Furthermore, in the distribution management system 1, in the sales channel using the retail store 10, when the delivery company 6 delivers the merchandise 4 to the retail store 10, the maker gets the cost of sales A by selling the merchandise 4 to the sales company 60. And the sales company 60 obtains the cost of sales B by selling that merchandise 4 to the retail store 10. And the retail store 10 obtains the cost of sales according to the payment of the price C of that merchandise 4 by selling this to the client.

Furthermore, in the distribution management system 1, in the sales channel using the direct-sales store 11, when the delivery company 6 delivers the merchandise 4 to the direct-sales store 11, the maker obtains the cost of sales A by selling the merchandise 4 to the sales company. And then, when the direct-sales store 11 managed by the sales company 60 sells the merchandise 4 to the client, it obtains the cost of sales B according to the payment of price C of the merchandise 4.

Accordingly, in this distribution management system 1, even though the maker and the sales company 60 actually do not deliver the merchandise in each sales channel, they can receive sales commission from the merchandise 4.

According to this embodiment, the manufacture control center 12 described above in FIG. 2 comprises a personal computer, and by transmitting a confirmation request of the order condition during the predetermined period to the shipment control server 55 (FIG. 3) via the Internet 3 by means of the personal computer, it obtains the client order data and the store order data for the specified period as the order condition data via the Internet 3.

Then, upon receipt of the order condition data from the shipment control server 55, the personal computer of the manufacture control center 12 displays the order condition screen 65 shown in FIG. 12 on the display unit based on the order condition data.

In this order condition screen 65, the order number display column 66A, sales method display column 66B, ID/code display column 66C, client's name display column 66D, the total amount sold display column 66E, the ordered date display column 66F, the ordered time display column 66G, condition display column 66H, detailed selection column 66I, and the cancel display column 66J are provided. And the history when and how the client ordered the merchandise 4 via the Internet 3 and the history how the retail store 10 and the direct-sales store 11 ordered the merchandise 4 via the Internet 3 are displayed at sight.

More specifically, in the order number display column 66A, the specific order number allocated to each order information data is displayed. And the order in the sales channel utilized the Internet 3 and the order of sales channel excluding the Internet 3 can be identified easily by changing the format of order numbers such as adding an alphabet to the number, or not adding the alphabet to the number.

Furthermore, in the sales method display column 66B, the Web, call center, retail store, and the direct-sales store utilized for sales of merchandise 4 are displayed Moreover, in the ID/code display column 66C, regarding the order received from the call center 8, the name of operator who is in charge of the order is displayed. And regarding the orders obtained from the retail store 10 and the direct-sales store 11, store codes of the retail store 10 and the direct-sales store 11 are displayed. In this connection, when the merchandise is ordered directly via the Internet 3, the client order data is transmitted to the distribution management center 2 not passing through the operator or store and thus, nothing is displayed in the ID/code display column 66C.

In the client's name display column 66D, the name of customer who ordered the merchandise 4 or purchased the merchandise 4 is displayed. And in the total amount sold display column 66E, the total amount sales of the merchandise 4 ordered, i.e., the price charged, is displayed. And in the ordered date display column 66F, the date when the sales managing server 20 (FIG. 3) received the client order information data and the store order data will be displayed. While in the ordered time display column 66G, the time when the sales managing server 20 received the client order information data and the store order data will be displayed.

In the condition display column 66H, whether the credit card to be used when buying the merchandise 4 is judged as in the usable condition or not as a result of its preliminary examination is displayed.

Then, a detail button 66IX is provided in the detail selection column 66I. And when a mouse cursor (not shown in Fig.) is moved onto the detail button 66IX and clicked by operating the mouse (not shown in Fig.), the CPU (not shown in Fig.) of the personal computer calls out the pertinent item display data and the client data (i.e., page data of sales registration screen 35 (FIG. 5) and the client information registration screen 43 (FIGS. 6 and 7)) from the distribution management center 2 via the Internet 3 and displays these.

Moreover, in the cancel display column 66J, a cancel button 66JX is provided only in the column corresponding to the order information obtained from the retail store 10 and the direct-sales store 11. And when the merchandise 4 is returned or exchanged, and when the mouse cursor is moved on the cancel button 66JX and clicked according to the mouse operation, the CPU calls out the page data of the corresponding sales registration screen 35 from the distribution management center 2 via the Internet 3 and displays this on the sales registration screen 35.

When the merchandise 4 is returned, the CPU cancels the sales registration screen 35 corresponding to the external operation. Moreover, in the case of exchanging the merchandise 4, the CPU can change the item number of the merchandise 4 on the sales registration screen 35 and register the item number again.

Thus, in the manufacture control center 12, the order condition of merchandise can be easily identified via the order condition screen 65, the sales registration screen 35 and the client information registration screen 43. And when changes occur in its contents, these can be changed and registered again.

Moreover, when a confirmation request of the stock control condition is entered, the personal computer of the manufacture control center 12, by transmitting this to the shipment control server 55 (FIG. 3) of the distribution management center 2 (FIG. 3) via the Internet 3, the PC receives the storage data and the distribution condition data from the shipment control server 55 and displays the stock control screen 68 (shown in FIG. 13) on the display unit.

In the stock control screen 68, the item name display column 69A, the item code display column 69B, the center stock display column 69C, the delivery company stock display column 69D and the registered time display column 69E are provided.

In the item name display column 69A, names of all merchandise 4 stored in the delivery company 6 are displayed, and in the item code display column 69B, the item codes of these merchandise 4 are displayed.

Moreover, in the center stock display column 69C, the quantity of stocks controlled by the settlement/delivery instructing server 21 (FIG. 3) of the distribution management center 2 is displayed based on the storage data. While in the delivery company stock display column 69D, the quantity of stocks controlled by the delivery company 6 is displayed adding the delivery condition data to the storage data.

In the registered time display column 69E, the time at which the quantity of stocks of each merchandise 4 is registered to the settlement/delivery instructing server 21 of the distribution management center 2 is displayed.

Thus, in the manufacture control center 12, stocks stored in the delivery company 6 can be easily recognized per merchandise 4 by the stock control screen 68. Thus, the actual sales condition can be grasped in accordance with the order condition screen 65 described above in FIG. 12.

According to the foregoing construction, in this distribution management system 1, the client order data to be obtained from the sales channel utilized the Internet 3 and the store order data of merchandise 4 for the quantity sold to be obtained from the retail store 10 and the direct-sales store 11 of sales channels excluding the Internet 3 are received by the sales managing server 20 of the distribution management center 2. And the settlement/delivery instructing server 21 controls the delivery of merchandise 4 based on the client order data and the store order data. The delivery company 6, as well as delivering the merchandise 4 to the client, delivers the merchandise 4 to the retail store 10 and the direct-sales store 11.

Furthermore, in the distribution management center 2, the shipment control server 55 periodically collects the client order data and the store order data received by the sales managing server 20 and the storage data and the delivery condition data showing the stock control result of the delivery company 6 by the settlement/delivery instructing server 21. And as a result, it grasps the actual sales condition of the merchandise 4 in all sales channels and simultaneously, forming the shipment instruction data based on the actual sales condition, the shipment control server 55 replenishes the merchandise 4 stored in the delivery company 6 as the stock.

Accordingly, in this distribution management system 1, since the merchandise 4 is transmitted to the client who ordered the merchandise 4 using the Internet 3 from the delivery company 6, and merchandise 4 are also delivered to the retail store 10 and the direct-sales store 11 from the same delivery company 6 and the merchandise sold will be replenished, the distribution stocks to the sales channel utilized the Internet 3 and the sales channel utilized the retail store 10 and the direct-sales store excluding the Internet 3 can be controlled one-dimensionally even though the retail store 10 and the direct-sales store 11 keep the merchandise 4 as the stock respectively.

Then, in the distribution management system 1, under the condition in which the distribution stocks in all sales channels are controlled one-dimensionally, the actual sales conditions of merchandise 4 in all sales channels are obtained and the merchandise 4 will be supplied to the delivery company 6 from the manufacturing factory 5. Accordingly, the merchandise 4 left unsold or shortage of merchandise 4 can be almost certainly avoided and the sufficient quantity of stocks can be constantly distributed in the market efficiently as if the manufacturing factory 5 is selling the merchandise 4 to the client directly.

Accordingly, if such distribution managing method according to the present invention would be used, distribution stocks in various sales channels can be controlled one-dimensionally regardless of domestic or foreign channel, by receiving the client order data and the store order data by means of Internet and it becomes possible to construct a new business model capable of distributing stocks in the market effectively based on the actual sales conditions of all sales channels that will be obtained according to the one-dimensional control of the distribution stocks.

According to the foregoing construction, since the sales managing server 20 of the distribution management center 2 receives the client order data to be obtained from the sales channel utilized the Internet 3, and the store order data of merchandise 4 for the quantity sold to be obtained from the retail store 10, and the direct-sales store 11 of sales channels excluding the Internet 3; the settlement/delivery instructing server 21 controls the distribution stocks in all sales channels one-dimensionally so that the merchandise 4 will be delivered to the client, the retail store 10 and the direct-sales store 11 directly from the delivery company 6 based on the client order data and the store order data; the shipment control server 55 periodically collects the client order data and the store order data, the storage data showing the control result of distribution stocks and the delivery condition data, grasps the actual sales conditions of merchandise 4 in all sales channels. Based on that actual sales condition, the shipment of merchandise 4 to the delivery company 5 is specified to the manufacturing factory 5, and the distribution stocks to all sales channels can be distributed in the market efficiently. Thereby, a distribution management system capable of constantly securing stocks correctly to all sales channels can be realized.

(3) Other Embodiments

The embodiment described above has dealt with the case of forming the shipment instruction data periodically by the shipment control server 55 of the distribution management center 2 and transmitting to the manufacturing factory 5. However, the present invention is not only limited to this but also the shipment instruction data can be formed by the shipment control server 55 and transmitted to the manufacturing factory 5 at an optional timing, such as at the time when the quantity of merchandise 4 sold is extremely increased or the stock is decreased contrary to expectation.

Furthermore, as described above in FIG. 2, the embodiment described above has dealt with the case of providing the distribution management center 2 independently connecting to the Internet 3. However, the present invention is not only limited to this but also the distribution management center 2 can be provided in various places such as in the manufacturing factory 5, of the maker's main office, provided that it is connected to the Internet 3.

Furthermore, the embodiment described above has dealt with the case of forming the shipment instruction data based on the client order data, the store order data, the storage data and the delivery condition data by the shipment control server 55. However, the present invention is not limited to this but also the shipment instruction data can be based on the client order data, the store order data and the storage data by the shipment control server 55.

Moreover, the embodiment described above has dealt with the case of periodically instructing the shipment of merchandise 4 to the manufacturing factory 5 based on the shipment instruction program stored in the hard disc of the CPU in advance by the shipment control server 55 of the distribution management center 2. However, the present invention is not only limited to this but also the shipment of merchandise 4 can be instructed periodically to the manufacturing factory 5 by installing the program storage medium on which the shipment instruction program is recorded to the shipment control server 55.

As the program storage medium to be used for installing the program to execute a series of processings into the shipment control server 55 and making the shipment control server 55 to the executable condition, the semi-conductor memory and the magnetic disc in which program can be stored temporarily or permanently can be used in addition to the package media, such as floppy disk, compact disc-read only memory (CD-ROM) and digital versatile disc (DVD). Moreover, as the means to store the program in these program storage media, cabled and wireless communication media such as the local area network and Internet, the digital satellite broadcasting can be used, and these can be stored via various kinds of communication interface such as router and modem.

Furthermore, the embodiment described above has dealt with the case of applying the sales managing server 20 of the distribution management center 2 as an order information receiving means for receiving the first order information of merchandise to be sold via the first sales channel utilized the network via the network and simultaneously receiving the second order information of merchandise for the quantity sold in each time the merchandise is sold via the second sales channel excluding the network via the network. However, the present invention is not limited to this but also includes various other order information receiving means which can be widely applied, provided that the first order information to be sold via the first sales channel utilized the network can be received via the network, and simultaneously, the second order information of the merchandise for the quantity sold can be received via the network in each time the merchandise is sold via the second sales channel excluding the network can be received via the network.

Furthermore, the embodiment described above has dealt with the case of applying the settlement/delivery instructing server 21 of the distribution management center 2 as a stock controlling means for controlling the stock of merchandise to be delivered to the first and the second sales channels based on the first and the second order information. However, the present invention is not only limited to this but also various other stock controlling means can be widely applied, provided that it can control the stock of merchandise to be delivered to the first and the second sales channels based on the first and the second order information.

Furthermore, the embodiment described above has dealt with the case of applying the shipment control server 55 of the distribution management center 2 as a supply instructing means for grasping the actual sales condition of merchandise in the first and the second sales channels based on the first and the second order information and the stock control information of merchandise given from the stock control means and for instructing the supply of merchandise to the supplier of stocks based on the actual sales condition. However, the present invention is not only limited to this but also various other supply control means can be widely applied, provided that these means can grasp the actual sales condition of merchandise in the first and the second sales channels based on the first and the second order information and the stock control information of merchandise given from the stock control means and can instruct the supply of merchandise to the supplier of the stock based on the actual sales condition.

Moreover, the embodiment described above has dealt with the case of applying the personal computer 7 owned by the client and the call center 8 as the first order information forming device for forming the first order information of merchandise to be sold via the first sales channel utilized the network. However, the present invention is not limited to this but also includes various other first order information forming devices, such as a cellular telephone and information processing terminal, can be widely applied, if the device is connected to the network and can form the first order information of merchandise to be sold via the first sales channel utilized the network.

Furthermore, the embodiment described above has dealt with the case of applying the personal computer 30 placed in the retail store 10 and the direct-sales store 11 as the second order information forming device for forming the second order information of merchandise for the quantity sold in each time merchandise is sold via the second sales channel excluding the network. However, the present invention is not limited to this but also, provided that the device can form the second sales information of merchandise for the quantity sold in each time the merchandise is sold via the second sales channel excluding the network, various other second order information forming devices, such as the personal computer placed in the home of employee of the retail store 10 and the direct-sales store 11, cellular telephone, and data processing terminal, can be widely applied.

Furthermore, the embodiment described above has dealt with the case of applying the client order data formed of merchandise specification data and the client data as the first order information of merchandise to be sold via the first sales channel utilized the network. However, the present invention is not limited to this but also the first order information formed of various other data can be widely applied, provided that at least the merchandise ordered and its delivering destination are known.

Furthermore, the embodiment described above has dealt with the case of applying the store order data comprised of merchandise specification data, client data, sales notification data and the store code to be obtained from the sales channel excluding the Internet 3 as the second order information of merchandise for the quantity sold to be transmitted via the network in each time the merchandise is sold via the second sales channel excluding the network. However, the present invention is not limited to this but also if at least the name of merchandise to be sold in the store and the store to which that merchandise is delivered would be known, the second order information formed of various other data can be widely applied.

Furthermore, the embodiment described above has dealt with the case of applying the distribution management center 2 formed of the sales managing server 20, the settlement/delivery instructing server 21 and the shipment control server 5 as the distribution management device that receives the first and the second order information to be transmitted from the first and the second order information forming device via the network, as well as controlling the stock of merchandise to be delivered to the first and the second sales channels based on the first and the second order information, and grasps the actual sales condition of merchandise in the first and the second sales channels based on the first and the second order information and the merchandise stock control information given from the stock control means, and instructs the supply of merchandise to the supplier of stocks based on the actual sales condition. However, the present invention is not limited to this but also the distribution management devices having various other constructions can be widely applied, provided that the device can receive the first and the second order information to be transmitted from the first and the second order information forming device via the network, and can control the stock of merchandise to be delivered to the first and the second sales channels based on the first and the second order information, and can grasp the actual sales condition of merchandise in the first and the second sales channels based on the first and the second order information and the stock control information given from the stock control means, and can instruct the supply of merchandise to the supplier of the stock based on the actual sales condition.

Furthermore, the embodiment described above has dealt with the case of applying the Internet 3 as the network. However, the present invention is not limited to this but also various other networks cabled or wireless can be widely applied.

Moreover, the embodiment described above has dealt with the case of applying the manufacturing factory 5 as the stock supplier to which the supply instructing means instructs the supply of merchandise. However, the present invention is not limited to this but also various other suppliers can be widely applied such as the delivery company, provided that it can supply the stock responding to the instruction of merchandise supply given from the supply instructing means.

According to the present invention as described above, since as well as the first order information of the merchandise to be sold via the first sales channel utilized the network is received by the order information receiving means via the network, the second order information of the merchandise for the quantity sold in each time the merchandise is sold via the second sales channel excluding the network is received by the order information receiving means via the network, the stocks of merchandise to be delivered to the first and the second sales channels is controlled by the stock control means based on the first and the second order information, the actual sales condition of merchandise in the first and the second sales channels is grasped by the supply control means based on the first and the second order information and the stock control information given from the stock control means, and based on the actual sales condition, supply of the merchandise will be instructed to the supplier of the stock, the distribution stock to the first and the second sales channels can be controlled one-dimensionally and the distribution stocks can be effectively distributed in the market according to the actual sales condition of merchandise in the first and the second sales channels. Thereby, stocks can be secured constantly to various sales channels with certainty.

Furthermore, since the supplier is instructed to stop the supply of merchandise to be removed from the market due to sales start of the new product during the predetermined period before the new product is put in the market, the stock of merchandise to be removed from the market can be remarkably reduced and the bad stocks at the time when the new product is put in the market can be remarkably reduced.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A distribution management device comprising:

means for receiving via a network first order information of merchandise and second order information of said merchandise, the first order information being formed based on a first purchase request received via a first sales channel that uses the network and the second order information being formed based on a second purchase request received via a second sales channel which is a point-of-sale location that does not use the network, the first order information indicating a first quantity of merchandise purchased via the first sales channel, and the second order information indicating a second quantity of merchandise purchased via the second sales channel;

means for generating stock control information to control a stock of said merchandise to be distributed to the first and the second sales channels based on the first quantity of merchandise purchased in the first sales channel in the first order information and the second quantity of merchandise purchased in the second sales channel in the second order information;

means for storing information regarding a debut date on which a new product in the merchandise will replace an old product in the merchandise, and a transportation delay time indicating a time required to transport the second quantity of merchandise from a manufacturing factory to a point-of-sale location that does not use the network to receive the second purchase request;

means for deleting, from the generated stock control information, a quantity of the old product purchased in the first sales channel and a quantity of the old product purchased in the second sales channel to produce updated stock control information when a current date is within the transportation delay time of the debut date; and means for instructing a supplier of said merchandise to supply the merchandise to the first sales channel and the second sales channel based on the updated stock control information from which was deleted the quantity of the old product purchased in the first sales channel that receives the first purchase request via the network and the quantity of the old product purchased in the second sales channel that receives the second purchase request at the point-of-sale location that does not use the network to receive the second purchase request.

2. The distribution management device according to claim 1 wherein said means for instructing instructs the supplier to stop supplying the old product in the merchandise due to a sales debut of the new product during the predetermined number of days before the debut date.

3. The distribution management device according to claim 1 wherein said means for receiving receives the first and the second order information via the Internet as said network.

4. The distribution management device according to claim 3 wherein said means for receiving receives the first and the second order information forming Web pages to be used in a World Wide Web service on said Internet.

5. A distribution management method comprising:

receiving via a network first order information of merchandise, the first order information being formed based on a first purchase request received via a first sales channel that uses the network and receiving via the network second order information of said merchandise, the second order information being formed based on a second purchase request received via a second sales channel which is a point-of sale location that does not use the network, the first order information indicating a first quantity of merchandise purchased via the first sales channel, and the second order information indicating a second quantity of merchandise purchased via the second sales channel;

generating stock control information to control a stock of said merchandise to be distributed to the first and the second sales channels based on said first quantity of merchandise purchased in the first sales channel in the first order information and the second quantity of merchandise purchased in the second sales channel in the second order information;

storing information regarding a debut date on which a new product in the merchandise will replace an old product in the merchandise, and a transportation delay time indicating a time required to transport the second quantity of merchandise from a manufacturing factory to a point-of-sale location that does not use the network to receive the second purchase request;

deleting, from the generated stock control information, a quantity of the old product purchased in the first sales channel and a quantity of the old product purchased in the second sales channel to produce updated stock control information when a current date is within the transportation delay time of the debut date; and instructing a supplier of said merchandise to supply the merchandise to the first sales channel and the second sales channel based on the updated stock control information from which was deleted the quantity of the old product purchased in the first sales channel that receives the first purchase request via the network and the quantity of the old product purchased in the second sales channel that receives the second purchase request at the point-of-sale location that does not use the network to receive the second purchase request.

6. The distribution management method according to claim 5 wherein said instructing instructs the supplier of said merchandise to stop supplying the old product in the merchandise due to new product sales during the predetermined number of days before the debut date of the new product.

7. The distribution management method according to claim 5 wherein said receiving the first and second order information comprises receiving the first and the second order information via the Internet as said network.

8. The distribution management method according to claim 7 wherein said receiving the first and second order information comprises receiving said first and the second order information forming Web pages to be used in a World Wide Web service on the Internet.

9. A program storage medium for making a distribution management device execute a program comprising:

receiving via a network first order information of merchandise, the first order information being formed based on a first purchase request received via a first sales channel that uses the network and receiving via the network second order information of said merchandise, the second order information being formed based on a second purchase request received via a second sales channel which is a point-of-sale location that does not use the network, the first order information indicating a first quantity of merchandise purchased via the first sales channel, and the second order information indicating a second quantity of merchandise purchased via the second sales channel;

generating stock control information to control a stock of said merchandise to be distributed to the first and the second sales channels based on said first quantity of merchandise purchased in the first sales channel in the first order information and the second quantity of merchandise purchased in the second sales channel in the second order information;

storing information regarding a debut date on which a new product in the merchandise will replace an old product in the merchandise, and a transportation delay time indicating a time required to transport the second quantity of merchandise from a manufacturing factory to a point-of-sale location that does not use the network to receive the second purchase request;

deleting, from the generated stock control information, a quantity of the old product purchased in the first sales channel and a quantity of the old product purchased in the second sales channel to produce updated stock control information when a current date is within the transportation delay time of the debut date; and instructing a supplier of said merchandise to supply the merchandise to the first sales channel and the second sales channel based on the updated stock control information from which was deleted the quantity of the old product purchased in the first sales channel that receives the first purchase request via the network and the quantity of the old product purchased in the second sales channel that receives the second purchase request at the point-of-sale location that does not use the network to receive the second purchase request.

10. The program storage medium according to claim 9 wherein said instructing instructs the supplier of the merchandise to stop supplying the old product in said merchandise due to new product sales.

11. The program storage medium according to claim 9 wherein said receiving the first and second order information comprises receiving the first and the second order information via Internet as the network.

12. The program storage medium according to claim 11 wherein said receiving the first and second order information comprises receiving the first and the second order information forming Web pages to be used in a World Wide Web service on said Internet.

13. A distribution management system comprising:
a first order information forming device for forming first order information indicating a first quantity of merchandise purchased in the first sales channel based on a first purchase request received from a first purchaser via a network;
a second order information forming device for forming second order information indicating a second quantity of merchandise purchased in a second sales channel based on a second purchase request received from a second purchaser via a second sales channel which is a point-of-sale location that does not use said network to receive the second purchase request from the second purchaser;
a distribution management device configured to receive the first and the second order information from the first and the second order information forming devices via said network, and generate stock control information to control a stock of said merchandise to be distributed to the first and second sales channels based on said first quantity of merchandise purchased in the first sales channel and the second quantity of merchandise purchased in the second sales channel; and the distribution management device further configured to store information regarding a debut date on which a new product in the merchandise will replace an old product in the merchandise, and a transportation delay time indicating a time required to transport the second quantity of merchandise from a manufacturing factory to a point-of-sale location that does not use the network to receive the second purchase request;

the distribution management device further configured to delete, from the generated stock control information, a quantity of the old product purchased in the first sales channel and a quantity of the old product purchased in the second sales channel to produce updated stock control information when a current date is within the transportation delay time of the debut date; and said distribution management device further configured to instruct a supplier of said merchandise to supply the merchandise to the first sales channel and the second sales channel based on the updated stock control information from which was deleted the quantity of the old product purchased in the first sales channel that receives the first purchase request via the network and the quantity of the old product purchased in the second sales channel that receives the second purchase request at the point-of-sale location that does not use the network to receive the second purchase request.

14. The distribution management system according to claim 13 wherein said distribution management device is configured to instruct the supplier to stop supplying the old product in the merchandise due to a new product sales during the predetermined number of days before the debut date of the new product.

15. The distribution management system according to claim 13 wherein said distribution management device is configured to receive the first and the second order information transmitted from the first and the second order information forming devices via the Internet as the network.

16. The distribution management system according to claim 15 wherein said distribution management device is configured to receive the first and the second order information forming Web pages to be utilized in a World Wide Web service on the Internet transmitted from said first and the second order information forming devices.

17. The distribution management system according to claim 1, further comprising:
means for receiving an indication that the merchandise is returned or exchanged at the point-of-sale location;
means for generating updated stock control information based on i) the stock control information indicating through which of the first sales channel and the second sales channel a purchase request was received, and ii) the indication that the merchandise is returned or exchanged; and
the means for instructing instructs the supplier to supply the merchandise based on the updated stock control information.

18. The distribution management method according to claim 5, further comprising steps of:
receiving an indication that the merchandise is returned or exchanged at the point-of-sale location;
generating updated stock control information based on i) the stock control information indicating through which of the first sales channel and the second sales channel a purchase request was received, and ii) the indication that the merchandise is returned or exchanged; and instructing the supplier to supply the merchandise based on the updated stock control information.

19. The program storage medium of claim 9, wherein the distribution management device executes the program further comprising steps of:

receiving an indication that the merchandise is returned or exchanged at the point-of-sale location;

generating updated stock control information based on i) the stock control information indicating through which of the first sales channel and the second sales channel a purchase request was received, and ii) the indication that the merchandise is returned or exchanged; and instructing the supplier to supply the merchandise based on the updated stock control information.

20. The distribution management system according to claim 13, wherein the distribution management device is further configured to receive an indication that the merchandise is returned or exchanged at the point-of-sale location, generate updated stock control information based on i) the stock control information indicating through which of the first sales channel and the second sales channel a purchase request was received, and ii) the indication that the merchandise is returned or exchanged, and instruct the supplier to supply the merchandise based on the updated stock control information.

21. A distribution management system comprising:

a first sales channel configured to receive a first purchase request from a first purchaser via a network;

a second sales channel configured to receive a second purchase request from a second purchaser at a point-of-sale location that does not use the network to receive the second purchase request from the second purchaser;

a first order information forming device configured to form first order information indicating a first quantity of merchandise purchased in the first sales channel based on the first purchase request received from the first purchaser via the first sales channel;

a second order information forming device configured to form second order information indicating a second quantity of merchandise purchased in the second sales channel based on the second purchase request received from the second purchaser via the second sales channel;

a distribution management device configured to receive the first and the second order information from the first and the second order information forming devices via said network, and generate stock control information to control a stock of said merchandise to be distributed to the first and second sales channels based on said first quantity of merchandise purchased in the first sales channel and the second quantity of merchandise purchased in the second sales channel;

the distribution management device further configured to store information regarding a debut date on which a new product in the merchandise will replace an old product in the merchandise, and a transportation delay time indicating a time required to transport the second quantity of merchandise from a manufacturing factory to a point-of-sale location that does not use the network to receive the second purchase request;

the distribution management device further configured to delete, from the generated stock control information, a quantity of the old product purchased in the first sales channel and a quantity of the old product purchased in the second sales channel to produce updated stock control information when a current date is within the transportation delay time of the debut date; and a module, at said distribution management device, configured to instruct a supplier of said merchandise to supply the merchandise to the first sales channel and the second sales channel based on the updated stock control information from which was deleted the quantity of the old product purchased in the first sales channel that receives the first purchase request via the network and the quantity of the old product purchased in the second sales channel that receives the second purchase request at the point-of-sale location that does not use the network to receive the second purchase request.

* * * * *